(12) United States Patent
Kulkarni et al.

(10) Patent No.: US 10,348,574 B2
(45) Date of Patent: Jul. 9, 2019

(54) HARDWARE MANAGEMENT SYSTEMS FOR DISAGGREGATED RACK ARCHITECTURES IN VIRTUAL SERVER RACK DEPLOYMENTS

(71) Applicant: VMware, Inc., Palo Alto, CA (US)

(72) Inventors: Rahul Kulkarni, Sunnyvale, CA (US); Vishnu Mohan Sekhar, Sunnyvale, CA (US); Mukund Gunti, Palo Alto, CA (US); Raj Yavatkar, Saratoga, CA (US); Donald Newell, Cupertino, CA (US); Thayumanavan Sridhar, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 290 days.

(21) Appl. No.: 15/198,914

(22) Filed: Jun. 30, 2016

(65) Prior Publication Data

US 2017/0054603 A1 Feb. 23, 2017

Related U.S. Application Data

(60) Provisional application No. 62/206,104, filed on Aug. 17, 2015.

(51) Int. Cl.
*G06F 9/50* (2006.01)
*H04L 12/24* (2006.01)

(52) U.S. Cl.
CPC ............ *H04L 41/12* (2013.01); *G06F 9/5077* (2013.01); *H04L 41/0893* (2013.01)

(58) Field of Classification Search
CPC .... H04L 41/12; H04L 41/0893; G06F 9/5077
See application file for complete search history.

(56) References Cited

U.S. PATENT DOCUMENTS

| 2012/0110086 | A1 | 5/2012 | Baitinger et al. |
| 2012/0110154 | A1 | 5/2012 | Adlung et al. |
| 2012/0303767 | A1* | 11/2012 | Renzin .................. G06F 15/177 709/220 |
| 2014/0007097 | A1* | 1/2014 | Chin .................... G06F 9/45533 718/1 |

(Continued)

OTHER PUBLICATIONS

International Searching Authority, "Search Report" issued in connection with PCT patent application No. PCT/US2016/047194, dated Oct. 5, 2016, 6 pages.

(Continued)

*Primary Examiner* — Nicholas R Taylor
*Assistant Examiner* — Tania M Pena-Santana
(74) *Attorney, Agent, or Firm* — Hanley, Flight & Zimmerman, LLC

(57) ABSTRACT

Hardware management systems for disaggregated rack architectures in virtual server rack deployments are disclosed herein. An example apparatus to manage disaggregated physical hardware resources in a physical rack includes a hardware management system to discover disaggregated physical hardware resources in the physical rack and generate a listing of the disaggregated physical hardware resources, and a physical resource manager to generate a composed resource based on resources from the listing of the disaggregated physical hardware resources, the hardware management system to manage the composed resource.

15 Claims, 10 Drawing Sheets

(56) References Cited

U.S. PATENT DOCUMENTS

| | | | |
|---|---|---|---|
| 2015/0012623 A1* | 1/2015 | Jubran | H04L 41/12 |
| | | | 709/220 |
| 2015/0381426 A1* | 12/2015 | Roese | H04L 41/0896 |
| | | | 709/226 |
| 2017/0003951 A1* | 1/2017 | Newell | G06F 8/65 |
| 2017/0255494 A1* | 9/2017 | Bartfai-Walcott | G06F 9/5027 |

OTHER PUBLICATIONS

International Searching Authority, "Written Opinion" issued in connection with PCT patent application No. PCT/US2016/047194, dated Oct. 5, 2016, 6 pages.

* cited by examiner

HARDWARE MANAGEMENT SYSTEMS FOR DISAGGREGATED RACK ARCHITECTURES IN VIRTUAL SERVER RACK DEPLOYMENTS

RELATED APPLICATION

This patent claims the benefit of U.S. Provisional Application Ser. No. 62/206,104, which was filed on Aug. 17, 2015, entitled "HARDWARE MANAGEMENT SYSTEMS FOR DISAGGREGATED RACK ARCHITECTURES IN VIRTUAL SERVER RACK DEPLOYMENTS," and is hereby incorporated herein by reference in its entirety.

FIELD OF THE DISCLOSURE

The present disclosure relates generally to cloud computing and, more particularly, to hardware management systems for disaggregated rack architectures in virtual server rack deployments.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

DETAILED DESCRIPTION

Figure 1:
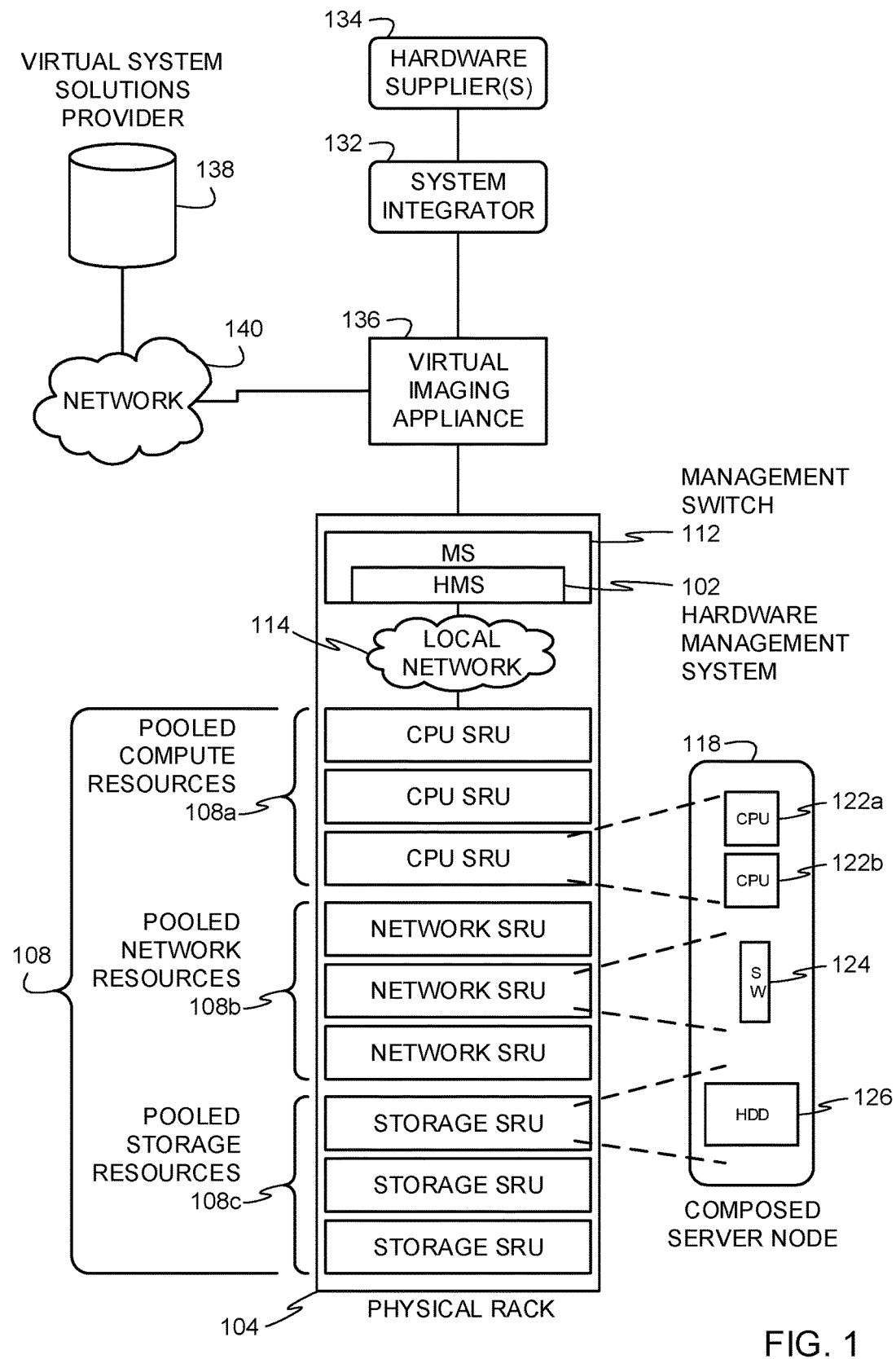
FIG. 1 depicts an example hardware management service (HMS) to manage a physical rack of pooled hardware resources configured according to a disaggregated rack architecture.

Cloud computing is based on the deployment of many physical resources across a network, virtualizing the physical resources into virtual resources, and provisioning the virtual resources for use across cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

When starting up a cloud computing environment or adding resources to an already established cloud computing environment, data center operators struggle to offer cost-effective services while making resources of the infrastructure (e.g., storage hardware, computing hardware, and networking hardware) work together to achieve pain-free installation/operation and optimizing the resources for improved performance. Prior techniques for establishing and maintaining data centers to provide cloud computing services often lock a data center into a single source for hardware resources because of the need to use customized virtualization software specifically designed for a particular type of hardware.

Examples disclosed herein enable using a disaggregated rack architecture (DRA) to establish and maintain data centers based on virtualization software that is vendor-agnostic. In this manner, data center operators are provided with the flexibility of selecting from any of a number of hardware manufacturers to meet the physical hardware needs of DRA-based data centers while making it relatively easy for the data center operators to initialize, virtualize and provision new DRA resources. That is, data center operators may use examples disclosed herein to source DRA hardware resources from any of a number of manufacturers without requiring the data center operators to undertake the burdens of developing new software to initialize, virtualize, and provision such DRA hardware resources.

A traditional server-based physical rack is based on a non-disaggregated configuration and includes numerous rack-mountable servers physically installed in a physical rack to form a cluster of fixed physical server nodes. A fixed physical server includes one or more central processing units (CPUs), one or more network interface cards (NICs), one or more random access memory (RAM) devices, and one or more storage hardware configured to operate in fixed association with each other to provide server functionality. When the fixed physical server resources (e.g., CPUs, NICs, RAM, storage, etc.) are virtualized to create logical resources (e.g., compute power, network throughput, RAM size, storage size, etc.), the logical resources can be allocated to different workloads to provide virtual services or cloud-based services. As such, a fixed physical server in a rack can be partitioned into numerous allocatable logical computer power resources, logical network resources, logical RAM resources, and/or logical storage resources. When one or more of the logical compute power resources, the logical network resources, logical RAM resources, and/or the logical storage resources of the fixed physical server is depleted, another physical server in the rack is needed to satisfy logical resource needs of another workload.

Unlike traditional non-disaggregated server-based physical racks in which numerous rack-mountable servers are physically installed in a physical rack to form a cluster of fixed physical server nodes, DRA-based physical racks include numerous rack mountable drawers or trays of physical resources. For example, one or more drawers include an array of physical compute modules, one or more drawers includes an array of physical network modules, one or more drawers include an array of RAM modules, one or more drawers include an array of physical storage modules, etc. In DRA-based physical rack, the different types of physical resources that are disaggregated across numerous drawers, can be aggregated across a local network between the drawers to compose numerous composed servers. For example, a composed server may be formed by network-aggregating one or more CPUs from a CPU drawer, one or more NICs from a NIC drawer, one or more RAM devices from a RAM drawer, and one or more hard disk drives (HDDs) or solid state drives (SSDs) from a storage drawer. Thus, unlike a non-disaggregated physical server that includes a set number of one or more CPUs, one or more NICs, one or more RAM devices, one or more storage hardware, etc. dedicated to that physical server, rack mountable drawers or trays of a DRA-based physical rack enables configuring composed servers that can be upgraded in any resource type (e.g., compute, network, RAM, storage, etc.) by adding another particular resource type. In this manner, if a particular resource of a composed server is completed allocated, another physical resource of the needed resource type can be network-aggregated to that composed server without needing to install an entirely different physical server.

Examples disclosed herein enable managing hardware resources in DRA-based physical racks to provide virtual services and/or cloud-based services from a rack deployment. For example, examples disclosed herein may be used to implement a hardware management service (HMS) and a physical resource manager (PRM) that enable managing hardware resources in a DRA-based physical rack to configure and maintain composed servers. The HMS and PRM provide a virtualization layer with access to such composed servers for use by the virtualization layer to create logical resources and allocate such logical resources to workloads that implement virtual servers and/or cloud-based services.

FIG. 1 depicts an example HMS 102 to manage an example physical rack 104 of disaggregated physical hardware resources 108 configured according to a disaggregated rack architecture (DRA). In the illustrated example, the HMS 102 runs in a management switch (MS) 112 that is installed in the physical rack 104 and is in communication with the physical hardware resources 108 via a local network 114. In this manner, the HMS 102 of the MS 112 can communicate with and manage the disaggregated physical hardware resources 106 to configure, maintain, and/or upgrade composed servers such as an example composed server node 118 shown in FIG. 1. For example, the disaggregated physical hardware resources 108 of FIG. 1 include pooled compute resources 108*a*, pooled network resources 108*b*, and pooled storage resources 108*c* from which the HMS 102 composes and configures the composed server node 118. In the illustrated example, the pooled compute resources 108*a*, the pooled network resources 108*b*, and the pooled storage resources 108*c* include corresponding arrays of hardware components (e.g., CPUs, NICs, HDDs, SSDs, etc.) installed in corresponding drawers or trays referred to herein as sub rack units (SRUs). For example, the drawers or trays of the pooled compute resources 108*a* have installed CPU sub rack unit modules (SRUMCPU) that include component arrays of CPUs, the drawers or trays of the pooled network resources 108*b* have installed switch sub rack unit modules (SRUMSW) that include component arrays of switches, and the pooled storage resources 108*c* have installed storage sub rack unit modules (SRUMS) that include component arrays of HDDs or SSDs. Although not shown, other types of pooled physical hardware resources may additionally or alternatively be included in the physical rack 104. For example, other physical hardware resources may include RAM, network interface cards (NICs), graphics processing units (GPUs), multimedia hardware accelerators, digital signal processors (DSPs), etc. An example DRA architecture that may be used to implement the disaggregated hardware in the physical rack 104 is an Intel disaggregated Rack-Scale Architecture (RSA). Although examples disclosed herein refer to aspects of the Intel disaggregated RSA, examples disclosed herein are not limited for use with the Intel disaggregated RSA. Instead, examples disclosed herein may be implemented using any other type of DRA architecture. In addition, the physical rack 104 of the illustrated example may also include non-disaggregated physical hardware resources such as fixed physical switches, fixed physical servers, and/or fixed physical storage that are also managed by the HMS 102 in the physical rack 104.

The physical rack 104 is implemented using a disaggregated rack architecture due to the disaggregated physical layout of the physical hardware resources 108 described above in which arrays of the same types of hardware resources are maintained in separate corresponding ones of the pooled compute resources 108*a*, the pooled network resources 108*b*, and the pooled storage resources 108*c*. Using this disaggregated physical layout of the physical hardware resources 108, the example HMS 102 can flexibly compose and configure numerous composed server nodes having different amounts of compute power, network throughput, and storage capacities based on the pooled compute resources 108a, the pooled network resources 108b, and the pooled storage resources 108c. For example, the HMS 102 composes and configures the composed server node 118 using two example CPUs 122a and 122b of the pooled compute resources 108a, an example switch 124 from the pooled network resources 108b, and an example HDD 126 from the pooled storage resources 108c.

In the illustrated example, each SRU of the disaggregated physical hardware resources 108 includes a shared function with which the HMS 102 communicates via the local network 113 to access the arrays of components of the pooled physical resources 108a, 108b, 108c. Example hardware to implement the shared function in each SRU includes a NIC+switch chip, a processor, and a back end optical interconnect to connect to an optical patch panel, for example, at the top of the physical rack 104. In some examples, the shared function hardware may be provided to each SRU using a mezzanine/add-on card installed in the SRU. In other examples, the shared function hardware is inserted or mounted directly on a printed circuit board (PCB) of each SRU. In some examples, the NIC+switch chip in the shared function hardware in each SRU provides the hardware components in the SRUMs with communication capabilities via the local network 114 to other hardware (e.g., other SRUs, the MS 112, a top-of-rack (TOR) switch shown in FIG. 2, etc.) in the physical rack 104. In such examples, the pooled network resources 108b may be omitted or may be used to implement other switches or NICs for specialized communications extending beyond communications needed to communicate with other hardware of the physical rack 104 via the local network 104.

In the illustrated example, a CPU (e.g., an Intel Atom class processor) of the shared function hardware runs an operating system and provides a control plane and management plane application programming interface (API) for an external management entity. In the Intel disaggregated RSA, this control plane and management plane API for an external management entity is called a Pooled System Management Engine (PSME) that runs Pooled System Management Firmware (PSMF). In examples disclosed herein, PSME and PSMF are used interchangeably. In the illustrated example, the external management entity is implemented using the HMS 102 in accordance with the teachings of this disclosure.

In the illustrated example, the HMS 102 is configured to communicate with the shared functions of SRUs via the PSME/PSMF interfaces to access the pooled physical resources 108a, 108b, 108c. For example, in the Intel disaggregated RSA, the PSME of each SRU can be accessed using a representational state transfer (REST) API. In the illustrated example, the REST API is an end point for a hypertext transfer protocol (HTTP) connection from an external management entity. For example, the PSME interface can be treated like a super baseboard management controller (BMC) that handles all of the SRUMs in the same SRU through a REST API.

The HMS 102 of the illustrated example is configured to manage the disaggregated physical hardware resources 108 in addition to non-disaggregated fixed physical hardware resources. Examples for managing non-disaggregated fixed physical hardware resources are disclosed in U.S. patent application Ser. No. 14/788,004, filed on Jun. 30, 2015, and titled "METHODS AND APPARATUS TO CONFIGURE HARDWARE MANAGEMENT SYSTEMS FOR USE IN VIRTUAL SERVER RACK DEPLOYMENTS FOR VIRTUAL COMPUTING ENVIRONMENTS," which is hereby incorporated herein by reference in its entirety. To manage the disaggregated physical hardware resources 108, the HMS 102 composes, configures, and manages composable servers (e.g., the composed server node 118) using disaggregated CPUs, memory, storage, and/or network components of the disaggregated physical hardware resources 108 discovered in the physical rack 104. The example HMS 102 is also capable of dynamically recomposing (e.g., upgrading, updating, downgrading, etc.) composed servers by, for example, adding and/or removing hardware components to/from composed servers. The example HMS 102 is also capable to discover SRUs, SRUMs, and/or components of the disaggregated physical hardware resources 108 without the presence of an intelligent platform management interface (IPMI). The example HMS 102 is capable of communicating with vendor specific management elements in the physical rack 104 (e.g., firmware/software with defined interfaces). The example HMS 102 is capable of performing its management operations without using a BMC interface when such a BMC interface is not available. The example HMS 102 is capable of performing fine-grain discovery of hardware components (e.g. SRUMCPU, SRUMMemory, SRUMStorage, SRUMSwitch, SRUs) of the disaggregated physical hardware resources 108 in addition to fixed physical component-level discovery such as discovery of fixed physical servers, fixed physical switches, fixed physical storage devices, etc. The example HMS 102 is capable of managing multiple layers of hardware hierarchy in the physical rack 104 such as SRU-level hardware, SRUM-level hardware, and component-level hardware in addition to a flat hierarchy of fixed physical hardware (e.g., fixed physical servers, fixed physical switches, fixed physical storage devices, etc.). The example HMS 102 is capable of supporting hot plugging/unplugging and hot swapping of disaggregated physical hardware (e.g., hot plugging/unplugging or hot swapping of SRUs and/or SRUMs). The example HMS 102 is also capable of multi-rack server composition by composing servers using disaggregated components from across numerous physical racks. The example HMS 102 is also capable of managing the physical rack 104 using multiple switching elements (e.g., a multiple top-of-rack (ToR) switches) or a single ToR switch element. The example HMS 102 is also capable of working with network topologies and configurations of switch elements having features specific to disaggregated rack architectures and which are different from, for example, ToR switch/configuration topologies used in physical racks having only fixed physical servers, switches, etc. The example HMS 102 is also capable of performing End of Row switch management. The example HMS 102 is capable of configuring and managing shared/pooled SRUM types such as SRUM, SRUMCPU, SRUMM, SRUMSW, SRUMS, etc. The HMS 102 is also capable of performing power management and managing shared power.

In the illustrated example of FIG. 1, the physical rack 104 is prepared by an example system integrator 132 for distribution to a customer. The system integrator 132 of the illustrated example receives and fulfills customer orders for computing hardware. The system integrator 132 of the example of FIG. 1 obtains computer hardware and/or software from other suppliers, such as the example hardware supplier(s) 134, and assembles individual hardware components and/or software into functional computing units to fulfill customer orders. Alternatively, the system integrator 132 may design and/or build some or all of the hardware components and/or software to be used in assembling computing units. According to the illustrated example, the system integrator 132 prepares computing units for other entities (e.g., businesses and/or persons that do not own/employ and are not owned/employed by the system integrator 132). Alternatively, the system integrator 132 may assemble computing units for use by the same entity as the system integrator 132 (e.g., the system integrator 132 may be a department of a company, wherein the company orders and/or utilizes the assembled computing units). As used herein, the term customer refers to any person and/or entity that receives and/or operates the computing units supplied by the system integrator 132. In some examples, the system integrator 132 is an entity independent of equipment manufacturers such as white-label equipment manufacturers that provide hardware without branding. In other examples, the system integrator 132 is an original equipment manufacturer (OEM) partner or original device manufacturer (ODM) partner that partners with OEMs or ODMs (e.g., non-white label equipment manufacturers) that provide brand-labeled hardware. Example OEM/ODM hardware includes OEM/ODM Servers such as Hewlett-Packard® (HP) servers and Lenovo® servers, and OEM/ODM Switches such as Arista switches, and/or any other OEM/ODM servers, switches, or equipment that are labeled by the original manufacturers.

According to the illustrated example, one type of computing unit ordered from and/or assembled by the example system integrator 132 is the physical rack 104. The physical rack 104 of the illustrated example is prepared by the system integrator 132 in a partially configured state to enable the disaggregated physical hardware resources 108 to be rapidly deployed for use in composing composed servers such as the composed server node 118 at a customer location (e.g., in less than 2 hours). For example, the system integrator 132 may install operating systems, drivers, operations software, management software, etc. The installed components may be configured with some system details (e.g., system details to facilitate intercommunication between the components of the physical rack 104) and/or may be prepared with software to collect further information from the customer when the virtual server rack is installed and first powered on by the customer.

To facilitate preparation of the physical rack 104 for distribution to a customer, the example system integrator 132 utilizes the virtual imaging appliance 136 to prepare and configure the operating systems, system configurations, software, etc. on the physical rack 104 prior to shipping the example physical rack 104 to the customer. The virtual imaging appliance 136 of the illustrated example is a virtual computing appliance provided to the system integrator 132 by an example virtual system solutions provider 138 via an example network 140 (e.g., the Internet, a virtual private network, etc.). The example virtual imaging appliance 136 is executed by the example system integrator 132 in a virtual computing environment of the system integrator 132. For example, the virtual imaging appliance 136 may be a virtual computing image, a virtual application, a container virtual machine image, a software application installed in an operating system of a computing unit of the system integrator 132, etc. The virtual imaging appliance 136 may alternatively be provided by any other entity and/or may be a physical computing device, may be multiple physical computing devices, and/or may be any combination of virtual and physical computing components.

The virtual imaging appliance 136 of the illustrated example retrieves software images and configuration data from the virtual systems solutions provider 138 via the network 140 for installation on the physical rack 104 during preparation of the physical rack 104. The virtual imaging appliance 136 of the illustrated example pushes (e.g., transmits, sends, etc.) the software images and configuration data to the components of the physical rack 104. For example, the virtual imaging appliance 136 of the illustrated example includes multiple network connections (e.g., virtual network connections, physical network connects, and/or any combination of virtual and network connections). For example, the virtual imaging appliance 136 of the illustrated example connects to a management interface of a network switch(es) installed in the physical rack 104, installs network configuration information on the network switch(es), and reboots the switch(es) to load the installed configuration to communicatively couple the virtual imaging appliance 136 with the disaggregated physical hardware resources 108 communicatively coupled via the network switch(es). The example virtual imaging appliance 136 also connects to a management network interface (e.g., an out of band (OOB) interface) of one or more fixed physical servers of the example physical rack 104 to cause an operating system(s) to be installed (e.g., utilizing a preboot execution environment (PXE) boot of an operating system installer). For example, in addition to the disaggregated physical hardware resources 108, the physical rack 104 may also be provided with one or more fixed physical servers having corresponding fixed CPU, RAM, storage, network, etc. hardware that the virtual imaging appliance 136 uses to install operating system(s) and other virtual environment management components (described in further detail in conjunction with FIGS. 3-6 and in the following pages) on the physical rack 104. In addition, the one or more fixed physical server nodes may also be used to run portions of the HMS 102. The example virtual imaging appliance 136 also causes the HMS 102 and the virtual environment management components to boot so that they can take over the deployment of the example physical rack 104.

The example virtual imaging appliance 136 is configured to perform many operations of the deployment without user intervention and without the need for a user of the example system integrator 132 to manually connect to the various interfaces of the components of the example physical rack 104. Furthermore, the user of the example virtual imaging appliance 136 is freed from the burden of locating the various software images that may be needed to configure the example physical rack 104 (e.g., firmware images for the network switch(es), operating system images for server(s), operating system driver(s) for hardware components installed in the physical rack 104, etc.). Additionally, the virtual environment management components deployed by the example virtual imaging appliance 136 are configured by the virtual imaging appliance 136 to facilitate easy deployment of the physical rack 104 at the customer location. For example, the virtual management components installed on the physical rack 104 by the example virtual imaging appliance 136 include graphical user interfaces that guide a customer through the process of inputting configuration parameters (e.g., details of the customer's network, information about existing virtual environments, etc.). In addition, the example virtual management components automatically discover some information about the customer's system (e.g., automatically discover information about existing virtual environments).

The network 140 of the illustrated example communicatively couples the example system integrator 132 with the virtual system solutions provider 138. According to the illustrated example, the network 140 is the Internet. Alternatively, the network 140 may be any type of local network, wide area network, wireless network, wired network, any combination of networks, etc.

The virtual system solutions provider 138 of the illustrated example is a business that distributes (e.g., sells) the example virtual imaging appliance 136. The virtual system solutions provider 138 of the illustrated example also provides a repository of images and/or other types of software (e.g., virtual machine images, drivers, operating systems, etc.) that may be retrieved by the virtual imaging appliance 136 and installed on the physical rack 104. The virtual system solutions provider 138 may alternatively be implemented by multiple entities (e.g., from a manufacturer(s) of the software) and/or any other type of entity.

Figure 2:
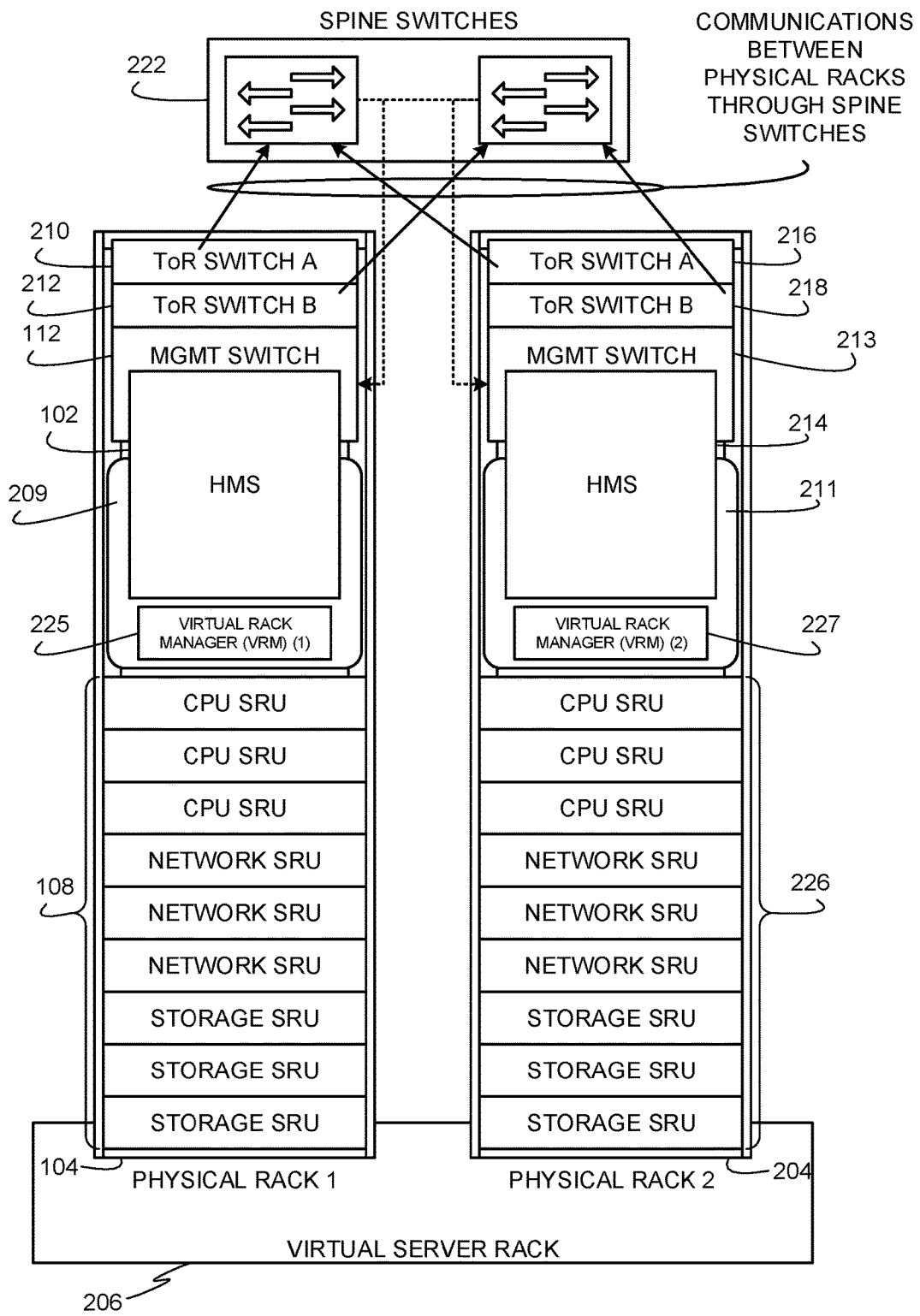
FIG. 2 depicts the example physical rack of FIG. 1 in combination with a second physical rack in an example virtual server rack deployment.

FIG. 2 depicts the example physical rack 104 of FIG. 1 (e.g., a first physical rack 104) and a second physical rack 204 in an example deployment of a virtual server rack 206. For example, the physical racks 104, 204 may be assembled by the example system integrator 132 of FIG. 1. In the illustrated example, the first physical rack 104 has an example top-of-rack (ToR) switch A 210, an example ToR switch B 212, the example management switch 112 of FIG. 1, and an example fixed physical server host node(0) 209. In the illustrated example, the management switch 112 and the server host node(0) 209 run the example hardware management service (HMS) 102 for the first physical rack 104. The second physical rack 204 of the illustrated example is also provided with an example ToR switch A 216, an example ToR switch B 218, an example management switch 213, and an example fixed physical server host node(0) 211. In the illustrated example, the management switch 213 and the fixed physical server host node (0) 211 run an HMS 214 for the second physical rack 204.

The fixed physical server host nodes(0) 209, 211 of the illustrated example included corresponding fixed or dedicated CPU, RAM, storage, NIC, etc. resources in a non-disaggregated configuration. That is, unlike the composed server node 118 of FIG. 1 that is composed and configured using the disaggregated physical hardware resources 108 of FIG. 1, the fixed physical server host nodes(0) 209, 211 are physically constructed to include the hardware resources that form a fixed physical server.

In the illustrated example, the management switches 102, 213 of the corresponding physical racks 104, 204 run corresponding out-of-band (OOB) agents and OOB plugins of the corresponding HMSs 102, 214. Also in the illustrated example, the fixed physical server host nodes(0) 209, 211 of the corresponding physical racks 104, 204 run corresponding IB agents, IB plugins, HMS service APIs, and aggregators.

In the illustrated example, the HMS 102, 214 connects to server management ports of the server host node(0) 209, 211 (e.g., using a baseboard management controller (BMC)), connects to ToR switch management ports (e.g., using 1 Gbps links) of the ToR switches 210, 212, 216, 218, and also connects to spine switch management ports of one or more spine switches 222. These example connections form a non-routable private Internet protocol (IP) management network for OOB management. The HMS 102, 214 of the illustrated example uses this OOB management interface to the server management ports of the server host node(0) 209, 211 for server hardware management. In addition, the HMS 102, 214 of the illustrated example uses this OOB management interface to the ToR switch management ports of the ToR switches 210, 212, 216, 218 and to the spine switch management ports of the one or more spine switches 222 for switch management. In examples disclosed herein, the ToR switches 210, 212, 216, 218 connect to server network interface card (NIC) ports (e.g., using 10 Gbps links) of server hosts in the physical racks 104, 204 for downlink communications and to the spine switch(es) (e.g., using 40 Gbps links) for uplink communications. In the illustrated example, the management switch 112, 213 is also connected to the ToR switches 210, 212, 216, 218 (e.g., using a 10 Gbps link) for internal communications between the management switch 207, 213 and the ToR switches 210, 212, 216, 218. Also in the illustrated example, the HMS 102, 214 is provided with IB connectivity to each disaggregated physical hardware SRU (e.g., SRUs of the example disaggregated physical hardware resources 108, 226) of the physical rack 104, 204. In the illustrated example, the IB connection interfaces to the disaggregated physical hardware resources 108, 226 via an operating system running on the shared functions of the SRUs using an OS-specific API such as vSphere API, command line interface (CLI), and/or interfaces such as Common Information Model from Distributed Management Task Force (DMTF).

The HMSs 102, 214 of the corresponding physical racks 104, 204 interface with virtual rack managers (VRMs) 225, 227 of the corresponding physical racks 104, 204 to instantiate and manage the virtual server rack 206 using the disaggregated physical hardware resources 108, 226 (e.g., processors, network interface cards, servers, switches, storage devices, peripherals, power supplies, etc.) of the physical racks 104, 204. In the illustrated example, the VRM 225 of the first physical rack 104 runs on three server host nodes of the first physical rack 104, one of which is the server host node(0) 209. As used herein, the term "host" refers to a functionally indivisible unit such as a physical fixed physical server or a composed server such as the composed server node 118 of FIG. 1 that is composed from the disaggregated physical hardware resources 108, 226. For example, a host may be composed, configured, or allocated, as a whole, to a virtual rack and/or workload; powered on or off in its entirety; or may otherwise be considered a complete functional unit. Also in the illustrated example, the VRM 227 of the second physical rack 204 runs on three server host nodes of the second physical rack 204, one of which is the server host node(0) 211. In the illustrated example, the VRMs 225, 227 of the corresponding physical racks 104, 204 communicate with each other through one or more spine switches 222. Also in the illustrated example, communications between disaggregated physical hardware resources 108, 226 of the physical racks 104, 204 are exchanged between the ToR switches 210, 212, 216, 218 of the physical racks 104, 204 through the one or more spine switches 222. In the illustrated example, each of the ToR switches 210, 212, 216, 218 is connected to each of two spine switches 222. In other examples, fewer or more spine switches may be used. For example, additional spine switches may be added when physical racks are added to the virtual server rack 206.

The VRM 225 runs on a cluster of three server host nodes of the first physical rack 104 using a high availability (HA) mode configuration. In addition, the VRM 227 runs on a cluster of three server host nodes of the second physical rack 204 using the HA mode configuration. Using the HA mode in this manner, enables fault tolerant operation of the VRM 225, 227 in the event that one of the three server host nodes in the cluster for the VRM 225, 227 fails. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a command line interface (CLI) and APIs are used to manage the ToR switches 210, 212, 216, 218. For example, the HMS 102, 214 uses CLI/APIs to populate switch objects corresponding to the ToR switches 210, 212, 216, 218. On HMS bootup, the HMS 102, 214 populates initial switch objects with statically available information. In addition, the HMS 102, 214 uses a periodic polling mechanism as part of an HMS switch management application thread to collect statistical and health data from the ToR switches 210, 212, 216, 218 (e.g., Link states, Packet Stats, Availability, etc.). There is also a configuration buffer as part of the switch object which stores the configuration information to be applied on the switch.

Figure 3:
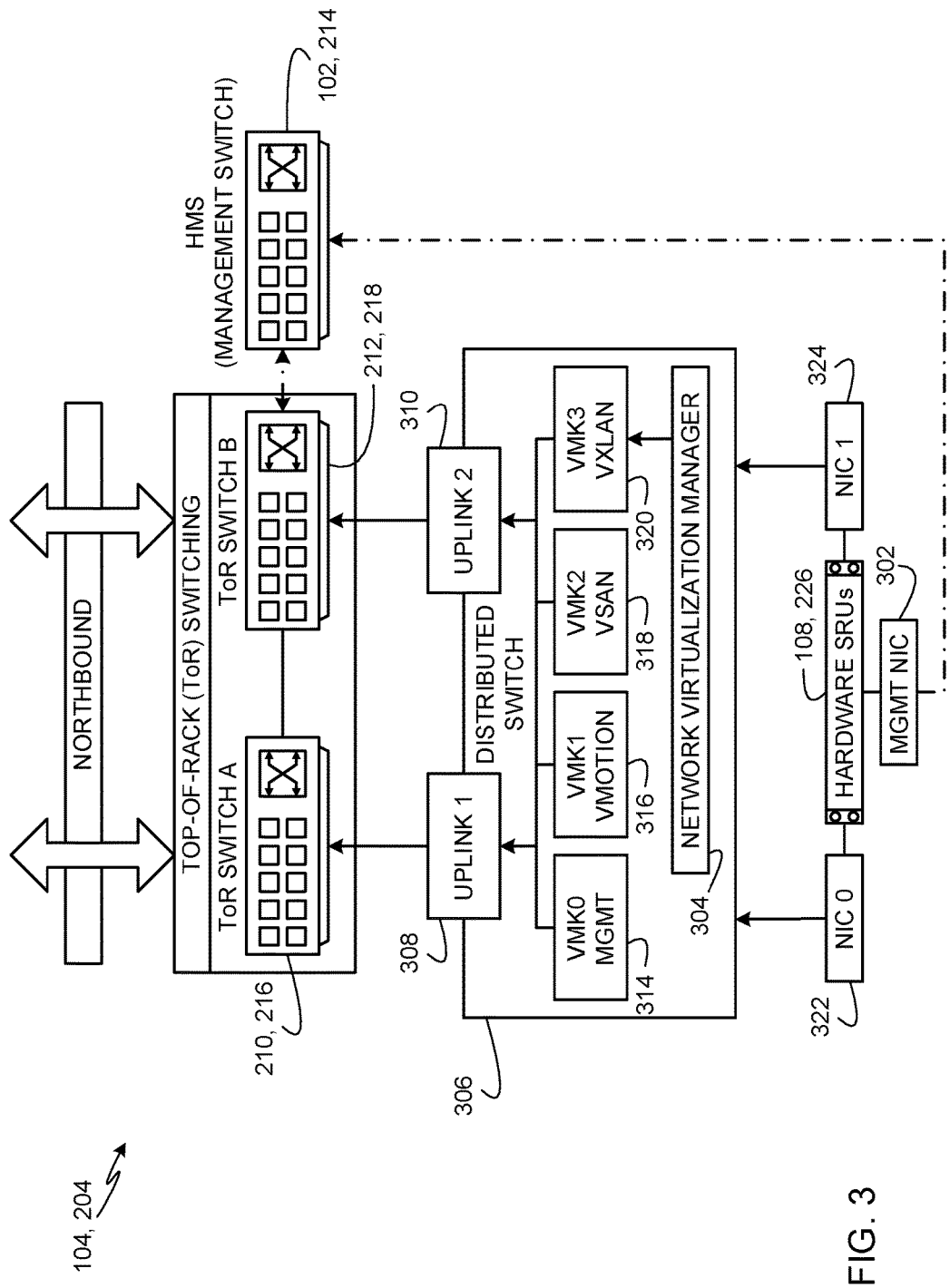
FIG. 3 depicts an example configuration of the example physical rack of FIGS. 1 and 2.

FIG. 3 depicts an example configuration of one of the example physical racks 104, 204 of FIGS. 1 and 2. In the illustrated example of FIG. 3, the HMS 102, 214 is in communication with a physical hardware SRU of the disaggregated physical hardware resources 108, 226 through a management network interface card (NIC) 302. For example, the NIC 302 may be part of the shared function in the physical hardware SRU. The example HMS 102, 214 is also shown in communication with the example ToR switches 210, 216, 212, 218. The example ToR switches 210, 216, 212, 218 are in communication with a distributed switch 306 through multiple uplink ports 308, 310 of the distributed switch 306. In the illustrated example, the uplink ports 308, 310 are implemented using separate NICs. In the illustrated example, the distributed switch 306 may be a fixed physical switch installed in the physical rack 104, 204 or may be a switch of the pooled network resources 108b (FIG. 1).

In the illustrated example, the distributed switch 306 runs numerous virtual adapters known as virtual machine kernels (VMKs) including an example VMK0 management kernel 314, an example VMK1 vMotion kernel 316, an example VMK2 vSAN kernel 318, and an example VMK3 VXLAN 320. The VMK0 management kernel 314 virtual adapter is software executed by the distributed switch 306 to use ones of the disaggregated physical hardware resources 108, 226 allocated for use by the distributed switch 306. In examples disclosed herein, the VRM1 225 of FIG. 2 uses the VMK0 management kernel 314 to communicate with the VRM2 227 through the spine switches 222 of FIG. 2. The VMK1 vMotion 316 virtual adapter is software executed by the distributed switch 306 to facilitate live migration of virtual machines between disaggregated physical hardware resources 108, 226 with substantially little or no downtime to provide continuous service availability from the virtual machines being migrated. The VMK2 vSAN 318 virtual adapter is software executed by the distributed switch 306 to aggregate locally attached data storage disks in a virtual cluster to create a storage solution that can be provisioned from the distributed switch 306 during virtual machine provisioning operations. The example VMK3 VXLAN 320 is virtual adapter software executed by the distributed switch 306 to establish and/or support one or more virtual networks provisioned in the distributed switch 306. In the illustrated example, the VMK3 VXLAN 320 is in communication with an example network virtualization manager 304. The network virtualization manager 304 of the illustrated example manages virtualized network resources such as physical hardware switches to provide software-based virtual networks. The example network virtualization manager 304 may be implemented using, for example, the VMware NSX® network virtualization manager 416 of FIG. 4. In the illustrated example of FIG. 3, the distributed switch 306 is shown interfacing with one or more of the disaggregated physical hardware resources 108, 226 through multiple NICs 322, 324. For example, the NICs 322, 324 may be part of the shared functions of SRUs of the disaggregated physical hardware resources 108, 226 or may be components in a network SRU of the pooled network resources 108b (FIG. 1) that includes numerous NIC SRUMs. In this manner, the VM kernels 314, 316, 318, 320 can instantiate virtual resources based on one or more, or portions of, the disaggregated physical hardware resources 108, 226.

The HMS 102, 214 of the illustrated examples of FIGS. 1, 2, and 3, is a stateless software agent responsible for managing individual hardware elements in a physical rack 104, 204 such as the disaggregated physical hardware resources 108, 226. In the illustrated example, the HMS 102, 214 is implemented using Java on Linux so that an OOB portion of the HMS 102, 214 run as a Java application on a white box management switch (e.g., the management switch 112, 213) in the physical rack 104, 204. However, any other programming language and any other operating system may be used to implement the HMS 102, 214. The disaggregated physical hardware resources 108, 226 that the HMS 102, 214 manages include white label SRUs for use with white label disaggregated rack architecture systems (e.g., Intel's Rack Scale Architecture (RSA)). Although the example HMS 102, 214 is disclosed herein as managing disaggregated physical hardware resources, in some examples, the HMS 102, 214 also manages non-disaggregated white label equipment such as white label servers, white label network switches, white label external storage arrays, and/or other non-disaggregated physical hardware. White label equipment is computing equipment that is unbranded and sold by manufacturers to system integrators that install customized software, and possibly other hardware, on the white label equipment to build computing/network systems that meet specifications of end users or customers. The white labeling, or unbranding by original manufacturers, of such equipment enables third-party system integrators to market their end-user integrated systems using the third-party system integrators' branding. In some examples, the HMS 102, 214 may also be used to manage non-white label equipment such as original equipment manufacturer (OEM) equipment. Such OEM equipment includes OEM Servers such as Hewlett-Packard® (HP) servers and Lenovo® servers, and OEM Switches such as Arista switches, and/or any other OEM server, switches, or equipment.

Figure 4:
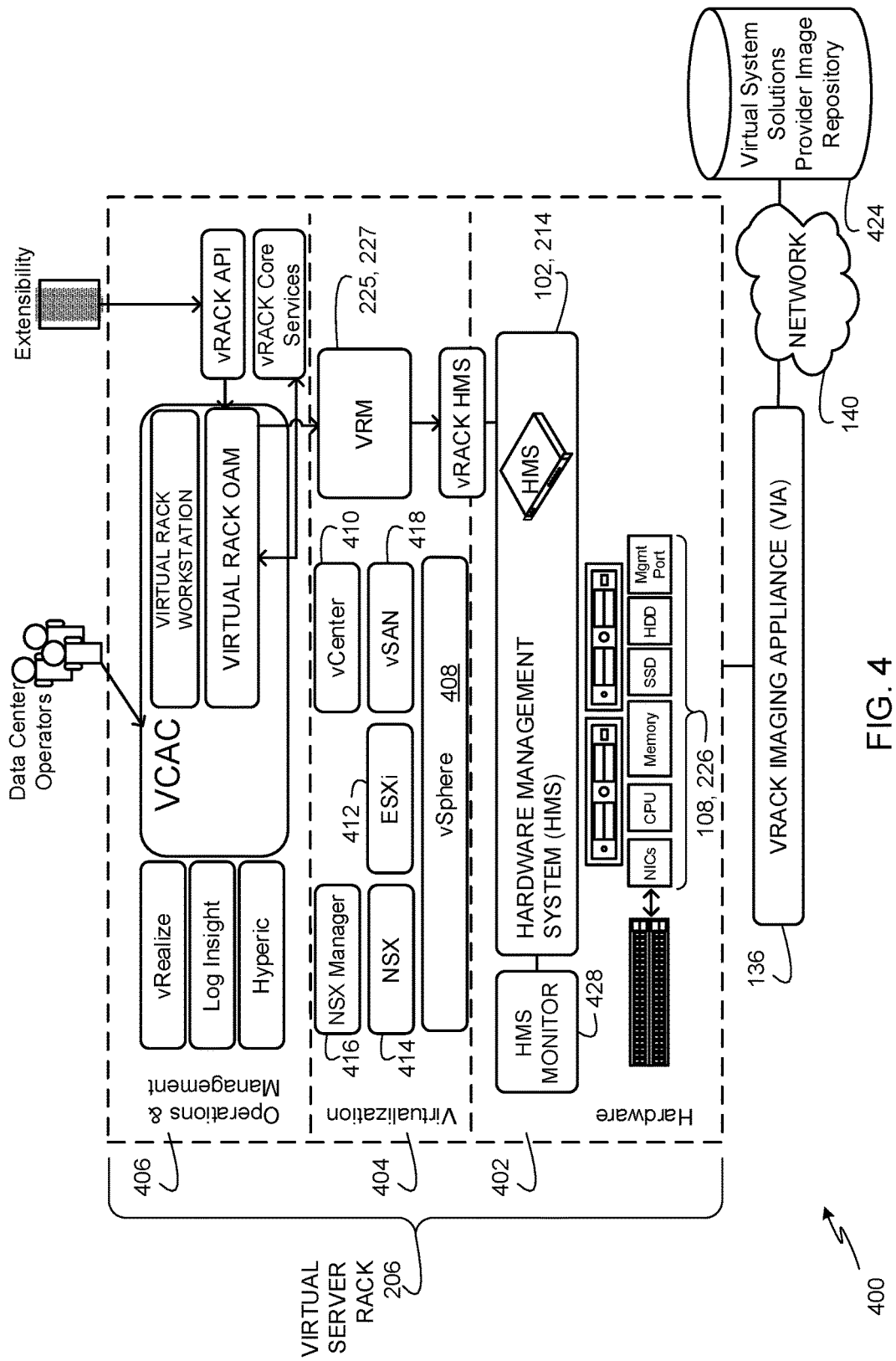
FIG. 4 depicts an example architecture to configure and deploy the example virtual server rack of FIG. 2 using a disaggregated rack architecture.

FIG. 4 depicts an example architecture 400 in which the example virtual imaging appliance 136 of FIG. 1 is used to configure and deploy the virtual server rack 206 (e.g., one or more of the physical racks 104, 204 of FIGS. 1-3). The example architecture 400 of FIG. 4 includes a hardware layer 402, a virtualization layer 404, and an operations and management layer 406. In the illustrated example, the hardware layer 402, the virtualization layer 404, and the operations and management layer 406 are part of the example virtual server rack 206 of FIG. 2. The virtual server rack 206 of the illustrated example is based on the physical racks 104, 204 of FIGS. 1-3. Alternatively, any either of the physical racks 104 or 204 may be operated in a stand-alone manner to instantiate and run the virtual server rack 206. The example virtual server rack 206 is configured to configure the disaggregated physical hardware resources 108, 226, to virtualize the disaggregated physical hardware resources 108, 226 into virtual resources, to provision virtual resources for use in providing cloud-based services, and to maintain the disaggregated physical hardware resources 108, 226 and the virtual resources. The example architecture 400 includes the virtual imaging appliance (VIA) 136 that communicates with the hardware layer 402 to store operating system (OS) and software images in memory of the hardware layer 402 for use in initializing physical resources needed to configure the virtual server rack 206. In the illustrated example, the VIA 136 retrieves the OS and software images from a virtual system solutions provider image repository 424 of the virtual systems solutions provider 138 (FIG. 1) via the example network 140. For example, the VIA 136 may be provided to the system integrator 132 of FIG. 1 by the example virtual system solutions provider 132 of FIG. 1 to configure new physical racks (e.g., the physical racks 104, 204 of FIGS. 1-3) for use as virtual server racks (e.g., the virtual server rack 206). That is, whenever the system integrator 132 wishes to configure new hardware (e.g., a new physical rack) for use as a virtual server rack, the system integrator 132 connects the VIA 136 to the new hardware, and the VIA 136 communicates with the virtual system provider image repository 424 to retrieve OS and/or software images needed to configure the new hardware for use as a virtual server rack. In the illustrated example, the OS and/or software images located in the virtual system provider image repository 424 are configured to provide the system integrator 132 with flexibility in selecting to obtain hardware from any of a number of hardware manufacturers. As such, end users can source hardware from multiple hardware manufacturers without needing to develop custom software solutions for each hardware manufacturer. Further details of the example VIA 136 are disclosed in U.S. patent application Ser. No. 14/752,699, filed on Jun. 26, 2015, and titled "Methods and Apparatus for Rack Deployments for Virtual Computing Environments," which is hereby incorporated herein by reference in its entirety.

The example hardware layer 402 of FIG. 4 includes the HMS 102, 214 of FIGS. 1-3 that interfaces with the disaggregated physical hardware resources 108, 226 (e.g., CPUs, NICs, switches, storage devices, peripherals, power supplies, etc.). The HMS 102, 214 is configured to manage individual composed server nodes such as the composed server node 118 of FIG. 1 composed from different components of the disaggregated physical hardware resources 108, 226. For example, managing of the composed server nodes involves composing and configures nodes, discovering composed nodes, bootstrapping composed nodes, resetting composed nodes, processing hardware events (e.g., alarms, sensor data threshold triggers) and state changes, exposing hardware events and state changes to other resources and a stack of the virtual server rack 206 in a hardware-independent manner. The HMS 102, 214 also supports rack-level boot-up sequencing of the disaggregated physical hardware resources 108, 226 and provides services such as secure resets, remote resets, and/or hard resets of the disaggregated physical hardware resources 108, 226.

The HMS 102, 214 of the illustrated example is part of a dedicated management infrastructure in a corresponding physical rack 104, 204 including the dual-redundant management switches 112, 213 and dedicated management ports attached to the server host nodes(0) 209, 211 and the ToR switches 210, 212, 216, 218 (FIGS. 2 and 3). In the illustrated example, one instance of the HMS 102, 214 runs per physical rack 104, 204. For example, the HMS 102, 214 may run on the management switch 112, 213 and the server host node(0) 209, 211 installed in the example physical rack 104, 204. In the illustrated example of FIG. 2 both of the HMSs 102, 214 are provided in corresponding management switches 112, 213 and the corresponding server host nodes (0) 209, 211 as a redundancy feature in which one of the HMSs 102, 214 is a primary HMS, while the other one of the HMSs 102, 214 is a secondary HMS. In this manner, one of the HMSs 102, 214 may take over as a primary HMS in the event of a failure of a hardware management switch 112, 213 and/or a failure of the server host nodes(0) 209, 211 on which the other HMS 102, 214 executes. In some examples, to achieve seamless failover, two instances of an HMS 102, 214 run in a single physical rack 104, 204. In such examples, the physical rack 104, 204 is provided with two management switches, and each of the two management switches runs a separate instance of the HMS 102, 214. In such examples, the physical rack 104 of FIGS. 1 and 2 runs two instances of the HMS 102 on two separate physical hardware management switches and two separate server host nodes(0), and the physical rack 204 of FIG. 2 runs two instances of the HMS 214 on two separate physical hardware management switches and two separate server host nodes(0). In this manner, for example, one of the instances of the HMS 102 on the physical rack 104 serves as the primary HMS 102 and the other instance of the HMS 102 serves as the secondary HMS 102. The two instances of the HMS 102 on two separate management switches and two separate server host nodes(0) in the physical rack 104 (or the two instances of the HMS 214 on two separate management switches and two separate server host nodes(0) in the physical rack 204) are connected over a point-to-point, dedicated Ethernet link which carries heartbeats and memory state synchronization between the primary and secondary HMS instances.

There are numerous categories of failures that the HMS 102, 214 can encounter. Some example failure categories are shown below in Table 1.

TABLE 1

HMS Failure Categories

| Failure Type | Examples | Impact | Remediation |
| --- | --- | --- | --- |
| 1. HMS Agent Software Failures | Unable to allocate new resources Memory corruption Software Crash CPU hogging Memory leaks | Short term loss of HMS function [Minutes] | Restart from Monitor |
| 2. HMS Agent Unrecoverable Software Failure | Unable to start demon Unable to resolve Failure Type1 Consistent software crash | Longer term loss of HMS function [Hours] | Maintenance mode thin HMS Agent till issue resolved |
| 3. Management Switch Operating System Software | Processes Failures Kernel Failures Unable to boot | Short to Long Term Loss of Mgmt Switch and HMS function | Process restart for user processes. Reboots for Kernel |

TABLE 1-continued

HMS Failure Categories

| Failure Type | Examples | Impact | Remediation |
|---|---|---|---|
| Failures | switch OS ONIE/bootloader issues | | failures Manual intervention for failed boots |
| 4. Management Switch Hardware Failures | Link down on management ports to Server Link Down on management ports to ToR nodes Link down from VRM Host to HMS on Mgmt Switch Critical Hardware alarms | Portions of rack unavailable VRM-HMS communication loss | Reset Links from PRM Notify VRM for manual intervention |
| 5. Management Switch Un-Recoverable Hardware Failure | Management switch fails to boot Erratic Resets of hardware while running | Long term loss of HMS/Mgmt Switch | Manual intervention or standby switch |

In the illustrated example of FIG. 4, the hardware layer 402 includes an example HMS monitor 428 to monitor the operational status and health of the HMS 102, 214. The example HMS monitor 428 is an external entity outside of the context of the HMS 102, 214 that detects and remediates failures in the HMS 102, 214. That is, the HMS monitor 428 is a process that runs outside the HMS daemon to monitor the daemon. For example, the HMS monitor 428 can run alongside the HMS 102, 214 in the same management switch 112, 213 as the HMS 102, 214. The example HMS monitor 428 is configured to monitor for Type 1 failures of Table 1 above and restart the HMS daemon when required to remediate such failures. The example HMS monitor 428 is also configured to invoke a HMS maintenance mode daemon to monitor for Type 2 failures of Table 1 above. In examples disclosed herein, an HMS maintenance mode daemon is a minimal HMS agent that functions as a basic backup of the HMS 102, 214 until the Type 2 failure of the HMS 102, 214 is resolved.

The example virtualization layer 404 includes the virtual rack manager (VRM) 225, 227. The example VRM 225, 227 communicates with the HMS 102, 214 to manage the disaggregated physical hardware resources 108, 226. The example VRM 225, 227 creates the example virtual server rack 206 out of underlying disaggregated physical hardware resources 108, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of disaggregated physical hardware resources 108, 226. The example VRM 225, 227 interfaces with components of the virtual system solutions provider 138 (FIG. 1) an example VMware vSphere® virtualization infrastructure components suite 408, an example VMware vCenter® virtual infrastructure server 410, an example ESXi™ hypervisor component 412, an example VMware NSX® network virtualization platform 414 (e.g., a network virtualization component or a network virtualizer), an example VMware NSX® network virtualization manager 416, and an example VMware vSAN™ network data storage virtualization component 418 (e.g., a network data storage virtualizer). In the illustrated example, the VRM 225, 227 communicates with these components to manage and present the logical view of underlying resources such as hosts and clusters. The example VRM 225, 227 also uses the logical view for orchestration and provisioning of workloads. Additional details of the VRM 225, 227 are disclosed below in connection with FIG. 5.

The VMware vSphere® virtualization infrastructure components suite 408 of the illustrated example is a collection of components to setup and manage a virtual infrastructure of servers, networks, and other resources. Example components of the VMware vSphere® virtualization infrastructure components suite 408 include the example VMware vCenter® virtual infrastructure server 410 and the example ESXi™ hypervisor component 412.

The example VMware vCenter® virtual infrastructure server 410 provides centralized management of a virtualization infrastructure (e.g., a VMware vSphere® virtualization infrastructure). For example, the VMware vCenter® virtual infrastructure server 410 provides centralized management of virtualized hosts and virtual machines from a single console to provide IT administrators with access to inspect and manage configurations of components of the virtual infrastructure.

The example ESXi™ hypervisor component 412 is a hypervisor that is installed and runs on composed servers (e.g., the example composed server node 118 of FIG. 1) composed from the example disaggregated physical hardware resources 108, 226 to enable the composed servers to be partitioned into multiple logical servers to create virtual machines.

The example VMware NSX® network virtualization platform 414 (e.g., a network virtualization component or a network virtualizer) virtualizes network resources such as physical hardware switches (e.g., physical switches of the pooled network resources 108b of FIG. 1) to provide software-based virtual networks. The example VMware NSX® network virtualization platform 414 enables treating physical network resources (e.g., switches) as a pool of transport capacity. In some examples, the VMware NSX® network virtualization platform 414 also provides network and security services to virtual machines with a policy driven approach.

The example VMware NSX® network virtualization manager 416 manages virtualized network resources such as physical hardware switches (e.g., physical switches of the pooled network resources 108b of FIG. 1) to provide software-based virtual networks. In the illustrated example, the VMware NSX® network virtualization manager 416 is a centralized management component of the VMware NSX® network virtualization platform 414 and runs as a virtual appliance on an ESXi host (e.g., the composed server node 118 of FIG. 1 running an ESXi™ hypervisor 412). In the illustrated example, a VMware NSX® network virtualization manager 416 manages a single vCenter server environment implemented using the VMware vCenter® virtual infrastructure server 410. In the illustrated example, the VMware NSX® network virtualization manager 416 is in communication with the VMware vCenter® virtual infrastructure server 410, the ESXi™ hypervisor component 412, and the VMware NSX® network virtualization platform 414.

The example VMware vSAN™ network data storage virtualization component 418 is software-defined storage for use in connection with virtualized environments implemented using the VMware vSphere® virtualization infrastructure components suite 408. The example VMware vSAN™ network data storage virtualization component clusters server-attached hard disk drives (HDDs) and solid state drives (SSDs) (e.g., storage devices of the pooled storage resources 108c of FIG. 1) to create a shared datastore for use as virtual storage resources in virtual environments.

Although the example VMware vSphere® virtualization infrastructure components suite 408, the example VMware vCenter® virtual infrastructure server 410, the example ESXi™ hypervisor component 412, the example VMware NSX® network virtualization platform 414, the example VMware NSX® network virtualization manager 416, and the example VMware vSAN™ network data storage virtualization component 418 are shown in the illustrated example as implemented using products developed and sold by VMware, Inc., some or all of such components may alternatively be supplied by components with the same or similar features developed and sold by other virtualization component developers.

The virtualization layer 404 of the illustrated example, and its associated components are configured to run virtual machines. However, in other examples, the virtualization layer 404 may additionally or alternatively be configured to run containers. A virtual machine is a data computer node that operates with its own guest operating system on a host using resources of the host virtualized by virtualization software. A container is a data computer node that runs on top of a host operating system without the need for a hypervisor or separate operating system.

The virtual server rack 206 of the illustrated example enables abstracting the disaggregated physical hardware resources 108, 226. In some examples, the virtual server rack 206 includes a set of physical units (e.g., one or more racks) with each unit including disaggregated hardware 108, 226 for use in composing, configuring, and allocating composed server nodes. From a user perspective, the example virtual server rack 206 is an aggregated pool of logic resources exposed as one or more vCenter ESXi™ clusters along with a logical storage pool and network connectivity. In examples disclosed herein, a cluster is a composed and/or fixed physical server group in a virtual environment. For example, a vCenter ESXi™ cluster is a group of fixed physical servers and/or composed servers (e.g., example composed server 118 of FIG. 1) composed using the disaggregated physical hardware resources 108, 226 that run ESXi™ hypervisors (developed and sold by VMware, Inc.) to virtualize processor, memory, storage, and networking resources into logical resources to run multiple virtual machines that run operating systems and applications as if those operating systems and applications were running on physical hardware without an intermediate virtualization layer.

In the illustrated example, the example OAM layer 406 is an extension of a VMware vCloud® Automation Center (VCAC) that relies on the VCAC functionality and also leverages utilities such as vRealize, Log Insight™, and Hyperic® to deliver a single point of SDDC operations and management. The example OAM layer 406 is configured to provide different services such as heat-map service, capacity planner service, maintenance planner service, events and operational view service, and virtual rack application workloads manager service.

In the illustrated example, a heat map service of the OAM layer 406 exposes component health for hardware mapped to virtualization and application layers (e.g., to indicate good, warning, and critical statuses). The example heat map service also weighs real-time sensor data against offered service level agreements (SLAs) and may trigger some logical operations to make adjustments to ensure continued SLA.

In the illustrated example, the capacity planner service of the OAM layer 406 checks against available resources and looks for potential bottlenecks before deployment of an application workload. Example capacity planner service also integrates additional rack units in the collection/stack when capacity is expanded.

In the illustrated example, the maintenance planner service of the OAM layer 406 dynamically triggers a set of logical operations to relocate virtual machines (VMs) before starting maintenance on a hardware component to increase the likelihood of substantially little or no downtime. The example maintenance planner service of the OAM layer 406 creates a snapshot of the existing state before starting maintenance on an application. The example maintenance planner service of the OAM layer 406 automates software upgrade/maintenance by creating a clone of the machines and proceeds to upgrade software on clones, pause running machines, and attaching clones to a network. The example maintenance planner service of the OAM layer 406 also performs rollbacks if upgrades are not successful.

In the illustrated example, an events and operational views service of the OAM layer 406 provides a single dashboard for logs by feeding to Log Insight. The example events and operational views service of the OAM layer 406 also correlates events from the heat map service against logs (e.g., a server starts to overheat, connections start to drop, lots of HTTP/503 from App servers). The example events and operational views service of the OAM layer 406 also creates a business operations view (e.g., a top down view from Application Workloads=>Logical Resource View=>Physical Resource View). The example events and operational views service of the OAM layer 406 also provides a logical operations view (e.g., a bottom up view from Physical resource view=>vCenter ESXi Cluster View=>VM's view).

In the illustrated example, the virtual rack application workloads manager service of the OAM layer 406 uses vCAC and vCAC enterprise services to deploy applications to vSphere hosts. The example virtual rack application workloads manager service of the OAM layer 406 uses data from the heat map service, the capacity planner service, the maintenance planner service, and the events and operational views service to build intelligence to pick the best mix of applications on a host (e.g., not put all high CPU intensive apps on one host). The example virtual rack application workloads manager service of the OAM layer 406 optimizes applications and virtual storage area network (vSAN) arrays to have high data resiliency and best possible performance at same time.

Figure 5:
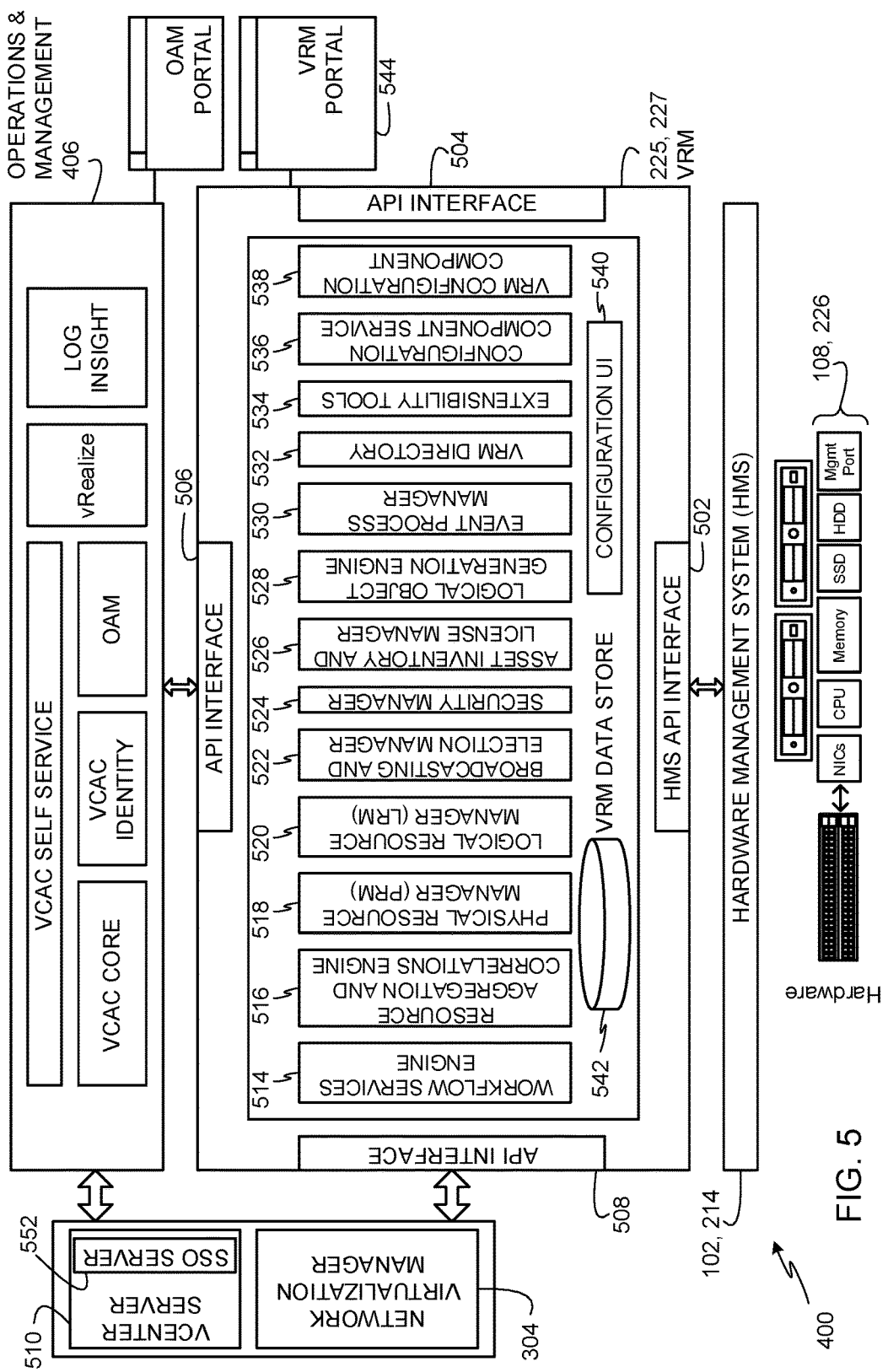
FIG. 5 depicts the example hardware management service (HMS) of FIGS. 2-4 interfacing between the example hardware and an example virtual resource manager (VRM) of FIGS. 2 and 4.

FIG. 5 depicts another view of the example architecture 400 of FIG. 4 showing the example HMS 102, 214 of FIGS. 2-4 interfacing between the example disaggregated physical hardware resources 108, 226 of FIGS. 2-4 and the example VRM 225, 227 of the example architecture 400 of FIG. 4. In the illustrated example, the VRM 225, 227 includes numerous application program interfaces (APIs) 502, 504, 506, 508 to interface with other components of the architecture 400. The APIs 502, 504, 506, 508 of the illustrated example include routines, protocols, function calls, and other components defined for use by external programs, routines, or components to communicate with the VRM 225, 227. Such communications may include sending information to the VRM 225, 227, requesting information from the VRM 225, 227, requesting the VRM 225, 227 to perform operations, configuring the VRM 225, 227, etc. For example, an HMS API interface 502 of the VRM 225, 227 is to facilitate communications between the HMS 102, 214 and the VRM 225, 227, another API interface 506 of the VRM 225, 227 is to facilitate communications between the operations and management layer 406 and the VRM 225, 227, and another API interface 508 of the VRM 225, 227 is to facilitate communications between the VRM 225, 227 and the network virtualization manager 304 and a vCenter server 510. Another API interface 504 of the VRM 225, 227 may be used to facilitate communications between the VRM 225, 227 and user interfaces for use by administrators to manage the VRM 225, 227.

The example VRM 225, 227 communicates with the HMS 102, 214 via the HMS API interface 502 to manage the disaggregated physical hardware resources 108, 226. For example, the VRM 225, 227 obtains and maintains inventory of the disaggregated physical hardware resources 108, 226 through communications with the HMS 102, 214. The example VRM 225, 227 also uses the HMS 102, 214 to discover new hardware (e.g., the disaggregated physical hardware resources 108, 226) and adds newly discovered hardware to inventory. The example VRM 225, 227 is also configured to manage the disaggregated physical hardware resources 108, 226 within the virtual server rack 206 by using the per-rack HMS 102, 214. The example VRM 225, 227 maintains the notion of fault domains and uses those domains in its mapping of logical resources (e.g., virtual resources) to the disaggregated physical hardware resources 108, 226. In response to notification of hardware events from the HMS 102, 214, the example VRM 225, 227 handles addition/removal of disaggregated physical hardware resources 108, 226 (e.g., additional SRUs and/or SRUMs), addition of new rack units, maintenance, and hard shutdowns/resets. The example VRM 225, 227 also translates physical sensor data and alarms to logical events.

In the illustrated example of FIG. 5, a software stack of the VRM 225, 227 includes an example workflow services engine 514, an example resource aggregation and correlations engine 516, an example physical resource manager (PRM) 518, an example logical resource manager (LRM) 520, an example broadcasting and election manager 522, an example security manager 524, an example asset inventory and license manager 526, an example logical object generation engine 528, an example event process manager 530, an example VRM directory 532, example extensibility tools 534, an example configuration component service 536, an example VRM configuration component 538, and an example configuration user interface (UI) 540. The example VRM 225, 227 also includes an example VRM data store 542. The example workflow services engine 514 is provided to manage the workflows of services provisioned to be performed by resources of the virtual server rack 206. The example resource aggregation and correlations engine 516 is provided to aggregate logical and physical resources and to coordinate operations between the logical and physical resources for allocating to services to be performed by the virtual server rack 206. The example PRM 518 is provided to provision, maintain, allocate, and manage the disaggregated physical hardware resources 108, 226 for use by the virtual server rack 206 for provisioning and allocating logical resources. The example LRM 520 is provided to provision, maintain, allocate, and manage logical resources.

The example broadcasting and election manager 522 is provided to broadcast or advertise capabilities of the virtual server rack 206. For example, services seeking resources of virtual server racks may obtain capabilities (e.g., logical resources) that are available from the virtual server rack 206 by receiving broadcasts or advertisements of such capabilities from the broadcasting and election manager 522. The broadcasting and election manager 522 is also configured to identify resources of the virtual server rack 206 that have been requested for allocation. The example security manager 524 is provided to implement security processes to protect from misuse of resources of the virtual server rack 206 and/or to protect from unauthorized accesses to the virtual server rack 206.

In the illustrated example, the broadcasting and election manager 522 is also provided to manage an example primary VRM selection process. In examples disclosed herein, a primary VRM selection process is performed by the VRM 225, 227 to determine a VRM that is to operate as the primary VRM for a virtual server rack. For example, as shown in FIG. 2, the example virtual server rack 206 includes the first VRM 225 that runs in the first physical rack 104, and the second VRM 227 that runs in the second physical rack 204. In the illustrated example of FIG. 2, the first VRM 225 and the second VRM 227 communicate with each other to perform the primary VRM selection process. For example, the VRM 225 may perform a process to obtain information from the second VRM 227 and execute an algorithm to decide whether it (the first VRM 225) or the second VRM 227 are to be the primary VRM to manage virtual resources of all the physical racks 104, 204 of the virtual server rack 206. In some examples, the broadcasting and election manager 522 instantiates a zookeeper 810a, b (FIG. 8) of the corresponding VRM 225, 227. In some examples, the broadcasting and election manager 522 performs the primary VRM selection process as part of the zookeeper 810a, b.

The example asset inventory and license manager 526 is provided to manage inventory of components of the virtual server rack 206 and to ensure that the different components of the virtual server rack 206 are used in compliance with licensing requirements. In the illustrated example, the example asset inventory and license manager 526 also communicates with licensing servers to ensure that the virtual server rack 206 has up-to-date licenses in place for components of the virtual server rack 206. The example logical object generation engine 528 is provided to generate logical objects for different portions of the disaggregated physical hardware resources 108, 226 so that the logical objects can be used to provision logical resources based on the disaggregated physical hardware resources 108, 226. The example event process manager 530 is provided to manage instances of different processes running in the virtual server rack 206. The example VRM directory 532 is provided to track identities and availabilities of logical and physical resources in the virtual server rack 206. The example extensibility tools 534 are provided to facilitate extending capabilities of the virtual server rack 206 by adding additional components such as additional physical racks to form the virtual server rack 206.

The example configuration component service 536 finds configuration components for virtualizing the physical rack 104, 204 and obtains configuration parameters that such configuration components need for the virtualization process. The example configuration component service 536 calls the configuration components with their corresponding configuration parameters and events. The example configuration component service 536 maps the configuration parameters to user interface properties of the example configuration UI 540 for use by administrators to manage the VRM 225, 227 through an example VRM portal 544. The example VRM portal 544 is a web-based interface that provides access to one or more of the components of the VRM 225, 227 to enable an administrator to configure the VRM 225, 227.

The example VRM configuration component 538 provides configuration logic to configure virtualization components of the example virtualization layer 404 of FIG. 4. For example, the VRM configuration component 538 configures the VRM 225, 227, the VMware vCenter® virtual infrastructure server 410 of FIG. 4, the ESXi™ hypervisor component 412 of FIG. 4, the VMware NSX® network virtualization platform 414 and the VMware NSX® network virtualization manager 416 of FIG. 4, and the VMware vSAN™ network data storage virtualization component 418 of FIG. 4.

The example VRM data store 542 is provided to store configuration information, provisioning information, resource allocation information, and/or any other information used by the VRM 225, 227 to manage hardware configurations, logical configurations, workflows, services, etc. of the virtual server rack 206.

Upon startup of the VRM 225, 227 of the illustrated example, the VRM 225, 227 is reconfigured with new network settings. To reconfigure the new network settings across backend components (e.g., the VMware vCenter® virtual infrastructure server 410, the ESXi™ hypervisor component 412, the VMware NSX® network virtualization platform 414, the VMware NSX® network virtualization manager 416, and the VMware vSAN™ network data storage virtualization component 418 of FIG. 4), the VRM 225, 227 serves the example configuration UI 540 to make configuration parameters accessible by an administrator. The VRM 225, 227 of the illustrated example allows a component to be plugged in and participate in IP address allocation/reallocation. For example, an IP reallocation service may be accessible via the configuration UI 540 so that a user can call the IP reallocation service upon plugging in a component. The example VRM 225, 227 logs status messages into the VRM data store 542, provides status updates to the configuration UI 540, and provides failure messages to the configuration UI 540. The example VRM 225, 227 allows components (e.g., the example VMware vCenter® virtual infrastructure server 410 of FIG. 4, the example ESXi™ hypervisor component 412 of FIG. 4, the example VMware NSX® network virtualization platform 414 of FIG. 4, the example VMware NSX® network virtualization manager 416 of FIG. 4, the example VMware vSAN™ network data storage virtualization component 418 of FIG. 4, and/or any other physical and/or virtual components) to specify the number of IP addresses required, including zero if none are required. In addition, the example VRM 225, 227 allows components to specify their sequence number which can be used by the VRM 225, 227 during an IP reallocation process to call the components to allocate IP addresses. The example VRM 225, 227 also enables configuration sharing through common objects so that components can obtain new and old IP Addresses of other components. The example VRM 225, 227 stores IP addresses of the components in the VRM data store 542. Additional examples of the VRM 225, 227 are disclosed in U.S. patent application Ser. No. 14/796,803, filed on Jul. 10, 2015, and titled "Methods and Apparatus to Configure Virtual Resource Managers for use in Virtual Server Rack Deployments for Virtual Computing Environment," Which is hereby incorporated herein by reference in its entirety.

In the illustrated example, the operations and management layer 406 is in communication with the VRM 225, 227 via the API interface 506 to provide different services such as heat-map service, capacity planner service, maintenance planner service, events and operational view service, and virtual rack application workloads manager service. In the illustrated example, the network virtualization manager 304 and the vCenter server 510 are in communication with the VRM 225, 227 to instantiate, manage, and communicate with virtual networks and virtual infrastructures. For example, the network virtualization manager 304 of the illustrated example may be implemented using the VMware NSX® network virtualization manager 416 of FIG. 4 to virtualize network resources such as physical hardware switches of the pooled network resources 108b of FIG. 1 to provide software-based virtual networks. The example vCenter server 510 provides a centralized and extensible platform for managing virtual infrastructures. For example, the vCenter server 510 may be implemented using the VMware vCenter® virtual infrastructure server 410 of FIG. 4 to provide centralized management of virtual hosts and virtual machines from a single console. The vCenter server 510 of the illustrated example communicates with the VRM 225, 227 via the API interface 508 to provide administrators with views of and access to configurations of the virtual server rack 206.

The vCenter server 510 of the illustrated example includes an example Single Sign On (SSO) server 552 to enable administrators to access and/or configure the VRM 225, 227. The example SSO server 552 may be implemented using a web browser SSO profile of Security Assertion Markup Language 2.0 (SAML 2.0). In the illustrated example, a SSO user interface of the SSO server 552 is accessible through the example VRM portal 544. In this manner, the VRM 225, 227 is made accessible yet protected using a SSO profile.

Figure 6:
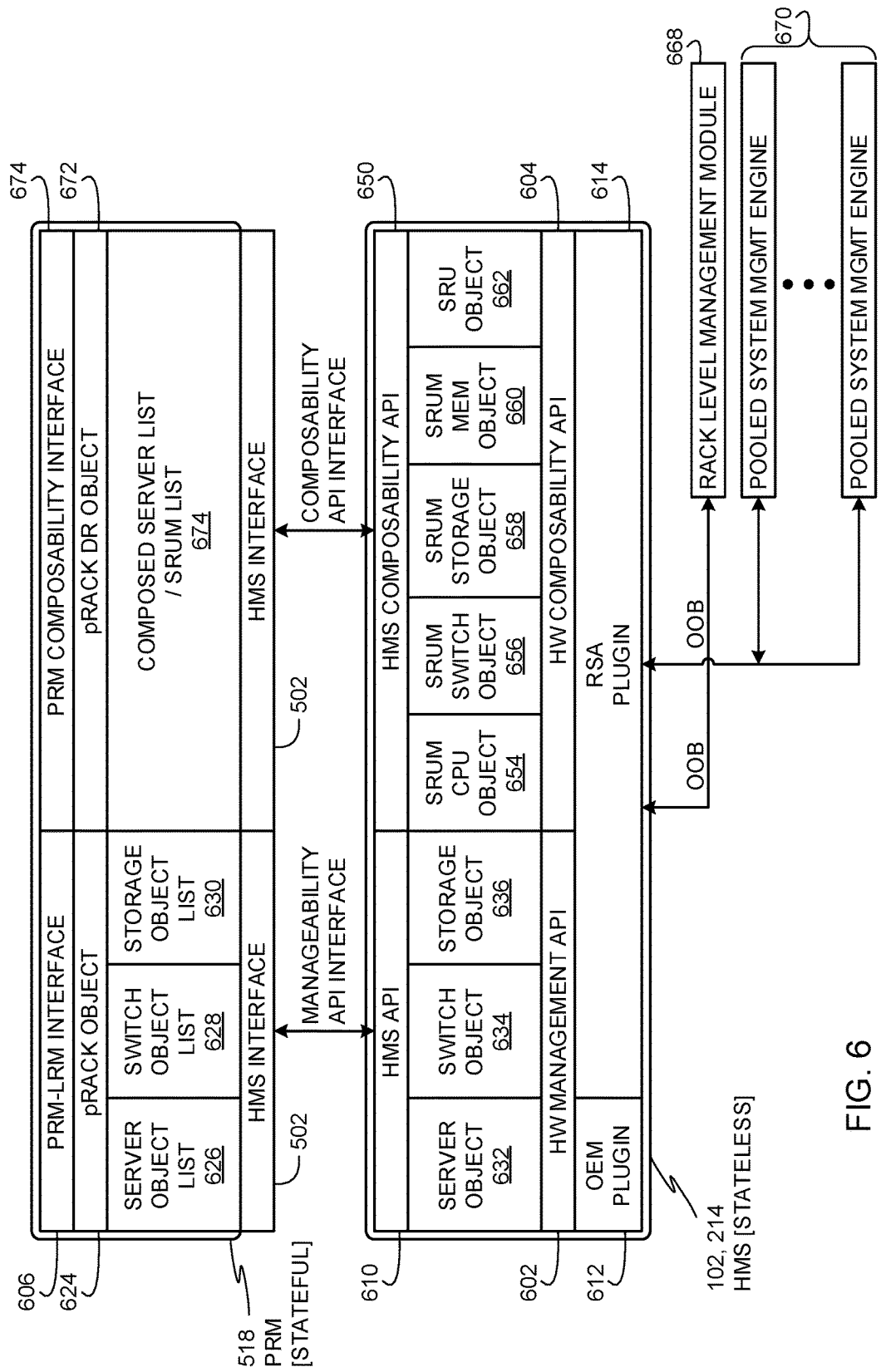
FIG. 6 depicts example application program interfaces (APIs) of the HMS of FIGS. 1-5 to enable an example physical resource manager (PRM) of FIG. 5 to communicate with disaggregated physical hardware resources of FIGS. 1-5.

FIG. 6 depicts example application program interfaces (APIs) of the HMS 102, 214 of FIGS. 1-5 to enable the example PRM 518 to communicate with the disaggregated physical hardware resources 108, 226 (FIGS. 1-5) and non-disaggregated physical hardware resources of the physical rack 104, 204 (FIGS. 1-3). In the illustrated example, the HMS 102, 204 includes hardware management application program interfaces (APIs) 602 of the HMS 102, 214 of FIGS. 1-5 to enable the PRM 518 to communicate with non-disaggregated physical hardware of the physical rack 104, 204. The HMS 102, 214 of the illustrated example also includes a hardware composability API 604 to enable the PRM 518 to communicate with the disaggregated physical hardware resources 108, 226 of FIGS. 1-5. The example PRM 518 is a component of the VRM 225, 227 (FIGS. 4 and 5) in the software stack of the virtual server rack 206 (FIG. 2). An example PRM 518 is provided in each physical rack 202, 204 and is configured to manage corresponding disaggregated physical hardware resources 108, 226 and/or non-disaggregated physical hardware resources of the corresponding physical rack 104, 204 and to maintain a software physical rack object for the corresponding physical rack 104, 204. The example PRM 518 interfaces with the corresponding HMS 102, 214 of the same physical rack 104, 204 to manage the disaggregated physical hardware resources 108, 226 at the SRU level, the SRUM level, and/or the component level. In some examples, the PRM 518 runs an HMS monitor thread (e.g., similar or part of the HMS monitor 428 of FIG. 4) to monitor a management switch 112, 213 that runs the HMS 102, 214 for Type 4 and Type 5 failures shown in Table 1 above. In some examples, the HMS monitor thread in the PRM 518 also monitors for some Type 3 failures shown in Table 1 above when an OS of the management switch 112, 213 needs external intervention.

In the illustrated example, the HMS 102, 214 is stateless in that it does not maintain any state information on persistent storage. Instead, the example HMS 102, 214 relies on the example PRM 518 for composition information (e.g., identifiers, properties, etc.) of composed resources and their associated sub-components (e.g., SRUMs). The example PRM 518 maintains state information across HMS power cycles and notifies the HMS 102, 214 of composed resources after an initial handshake between the PRM 518 and the HMS 102, 214 and after the HMS 102, 214 performs a discovery process and provides the PRM 518 with an inventory of discovered disaggregated physical hardware resources.

In the illustrated example, the PRM 518 provides a PRM-LRM interface 606 (e.g., a set of PRM-LRM API's) for use of a physical rack object (e.g., the generic pRACK object 624 of FIG. 6) by the example LRM 520 (FIG. 5). The example LRM 520 interacts with individual PRM 518 instances to employ physical resources based on physical resource requirements of the LRM 520. In some examples, the PRM 518 runs as part of an LRM application on a given server node (e.g., the composed server node 118 of FIG. 1 or a fixed physical server node) in a virtual server rack 206. In the illustrated example, the LRM 520 is implemented using Java on Linux. However, any other programming language and any other operating system may be used. The PRM 518 of the illustrated example runs in an x86-based Linux Virtual Machine environment as part of the VRM 225, 227 on a designated server node in the physical rack 104, 204.

In the illustrated example of FIG. 6, the HMS 102, 214 publishes HMS API 610 for use by original equipment manufacturers (OEMs) of non-disaggregated physical hardware resources to integrate hardware or software with the software stack of the virtual server rack 206. In the illustrated example, the integration point for OEM non-disaggregated hardware is the hardware management API 602. In the illustrated example, OEM non-disaggregated hardware is provided with vendor-specific plugin interfaces that may be developed for use by the hardware management API 602 to facilitate communications with physical hardware of particular vendors having vendor-specific interfaces. In the illustrated example, such vendor-specific plugin interfaces interface to corresponding non-disaggregated hardware using interface protocols supported by the underlying non-disaggregated hardware components (e.g., an IPMI API, a representational state transfer (REST) API, an extensible markup language (XML) API, a hypertext transfer protocol (HTTP) API, a customer information model (CIM) API, etc.). In the illustrated example, non-disaggregated physical hardware resources installed in the physical rack 104, 204 may include one or more physical server(s), one or more physical switch(es), and external storage. The physical switches of the illustrated example include the management switch 112, 213 and the ToR switches 210, 212, 216, 218 of FIG. 2.

In the illustrated example, the HMS 102, 214 provides the example HMS API 610 for use by the PRM 518 to access use of virtual resources based on the non-disaggregated physical hardware resources. In the illustrated example, the HMS API 610 are not specific to any particular vendor and/or hardware and are implemented using a REST/JSON (JavaScript object notation) API protocol. However, any other API protocol may be used. The example HMS API 610 communicate with underlying non-disaggregated physical hardware resources, which are encapsulated in a set of software objects such as an example server object 632, an example switch object 634, and/or an example storage object 636. In the illustrated example, the HMS 102, 214 maintains the server object 632, the switch object 634, and the storage object 636, and their associated properties. In the illustrated example, the HMS 102, 214 runs the HMS APIs 610 on the example server host node(0) 209, 211 (FIG. 2) to interface with the example PRM 518, with an example OEM plugin 612, and with an example RSA plugin 614. The example OEM plugin 612 and the example RSA plugin 614 operate as out-of-band (OOB) communication agents to communicate with non-disaggregated physical hardware resources and the example disaggregated physical hardware resources 108, 226. In the illustrated example, the OEM plugin 612 and the example RSA plugin 614 run on the management switch 112, 213. In the illustrated example, the OEM plugin 612 and the example RSA plugin 614 are configured to communicate with vendor hardware via vendor-specific interfaces.

The example HMS 102, 214 internally maintains the hardware management API 602 to service API requests received at the HMS API 610. The hardware management API 602 of the illustrated example is vendor-specific and is implemented as a vendor-specific plugin to the HMS 102, 214. The hardware management API 602 uses the OEM plugin 612 and the RSA plugin 614 to interface with vendor-specific plugin interfaces of non-disaggregated physical hardware resources to communicate with the non-disaggregated physical hardware resources. For example, the hardware management API 602 uses the OEM plugin 612 and the RSA plugin 614 exchange data between the HMS API 610 and the vendor-specific plugin interface of non-disaggregated physical hardware resources. Example vendor-specific interfaces may be proprietary to corresponding OEM vendors for hardware management. Regardless of whether the vendor-specific interfaces are proprietary, or part of an industry standard or open interface, the published hardware management API 602 is configured to work seamlessly between the PRM 518 and non-disaggregated physical hardware resources to manage the non-disaggregated physical hardware resources. In examples disclosed herein, a single generic API interface (e.g., a REST API, a JSON API, etc.) implementing the example HMS API 610 is provided between the PRM 518 and the HMS 102, 214 to facilitate hiding all hardware and vendor specificities of non-disaggregated hardware management in the HMS 102, 214 and isolating the complexity of such hardware and vendor specificities from upper layer processes in the PRM 518 and/or the LRM 520.

In examples disclosed herein, the HMS 102, 214 uses an IPMI/DCMI (Data Center Manageability Interface) for OOB management. Example OOB operations performed by the HMS 102, 214 include discovery of new hardware, bootstrapping, remote power control, authentication, hard resetting of non-responsive hosts, monitoring catastrophic hardware failures, and firmware upgrades. In examples disclosed herein, an Integrated BMC (baseboard management controller) Embedded local area network (LAN) channel is used for OOB management of fixed physical server hosts. In examples disclosed herein, one dedicated interface is enabled for OOB management traffic. In such examples, the interface is enabled for dynamic host configuration protocol (DHCP) and connected to a management switch (e.g., the management switch 112, 213 running the HMS 102, 214). In examples disclosed herein, an administrative user is created to operate the dedicated interface for OOB management traffic. An example HMS OOB thread uses IPMI commands to discover and manage fixed physical server nodes over the dedicated interface for OOB management traffic. Example IPMI features that may be used over the Integrated BMC Embedded LAN for OOB management traffic include the following properties and sensors.

PROPERTIES

Device ID
Cold Reset
Get Self Test Results
Set/Get ACPI Power State
Set/Get User Name
Set/Get User Access
Set/Get User Password
Get Chassis Status
Chassis Control Power Down/Up/Power Cycle/Hard Reset
Chassis Identity
Set/Get System Boot Options
Get System Restart Cause
Set/Get LAN configuration
DHCP Host Name
Authentication Type Support
Authentication Type Enable
Primary RMCP Port Number
Default Gateway

SENSORS

Power Unit Status
BMC Firmware Health
HDD status
Processor Status
Processor DIMM
Processor Temperature The example HMS 102, 214 uses in band (IB) management to periodically monitor status and health of physical resources (e.g., non-disaggregated physical hardware resources and/or the disaggregated physical hardware resources 108, 226) and to keep the server object 632 and the switch object 634 up to date. In examples disclosed herein, the HMS 102, 214 uses Distributed Management Task Force (DMTF) Common Information Model (CIM) providers in a VMware ESXi™ hypervisor and CIM client for IB management. The CIM is the software framework used for managing hardware devices and services defined by the DMTF and supported in the VMware ESXi™ hypervisor. CIM providers are classes that receive and fulfill client requests dispatched to them by a CIM object manager (CIMOM). For example, when an application requests dynamic data from the CIMOM, it uses the CIM provider interfaces to pass the request to the CIM provider. Example IB operations performed by the HMS 102, 214 include controlling power state, accessing temperature sensors, controlling BIOS (Basic Input/Output System) inventory of hardware (e.g., CPUs, memory, disks, etc.), event monitoring, and logging events. In examples disclosed herein, the main components which the HMS 102, 214 monitors using IB management are I/O devices (e.g., Network Interface Cards, PCI-e interfaces, and Disk Drives). In examples disclosed herein, the HMS 102, 214 uses CIM providers to monitor such I/O devices. Example CIM providers may be developed as VMware ESXi™ hypervisor userworlds to interface with drivers corresponding to I/O devices being monitored to gather data pertaining to those I/O devices. In some examples, the CIM providers are C++ classes, which define sets of objects and corresponding properties for use by the HMS 102, 214 to fetch data from the underlying physical resources (e.g., hardware I/O devices).

The PRM 518 of the illustrated example exposes a physical rack object and its associated sub-objects in a generic vendor neutral manner to the example LRM 520. Example sub-objects of the physical rack object for non-disaggregated physical hardware resources include an example server object list 626 (e.g., a list of servers), an example switch object list 628 (e.g., a list of switches), and a storage object list 630 (e.g., a list of external storage). The example PRM 518 communicates with the example HMS 102, 214 using the example HMS API 610 to manage non-disaggregated physical resources (e.g., hardware) in the physical rack 104, 204, and to obtain information and inventory of non-disaggregated physical resources available in the physical rack 104, 204. In the illustrated example, the HMS 102, 214 executes instructions from the PRM 518 that are specific to underlying non-disaggregated physical hardware resources based on the hardware management API 602 of those physical resources. That is, after the HMS 102, 214 receives an instruction via the HMS API 610 from the PRM 518 that corresponds to an action on a particular non-disaggregated physical hardware resource in the physical rack 104, 204, the HMS 102, 214 uses the example hardware management API 602 to issue a corresponding instruction to the particular non-disaggregated physical resource using a hardware management API of that particular physical resource. In this manner, the PRM 518 need not be configured to communicate with numerous different APIs of different non-disaggregated physical resources in the physical rack 104, 204. Instead, the PRM 518 is configured to communicate with the HMS 102, 214 via the HMS API 610, and the HMS 102, 214 handles communicating with numerous different, specific APIs of different non-disaggregated physical resources through the example hardware management API 602. By using the HMS API 610 for the PRM 518 to interface with and manage non-disaggregated physical resources through the HMS 102, 214, the physical racks 104, 204 may be configured or populated with non-disaggregated hardware from numerous different manufacturers without needing to significantly reconfigure the PRM 518. That is, even if such manufacturers require use of different APIs specific to their non-disaggregated equipment, the HMS 102, 214 is configured to handle communications using such different APIs without changing how the PRM 518 uses the HMS API 610 to communicate with the non-disaggregated physical resources via the HMS 102, 214. Thus, the separation of the example HMS API 610 from the example hardware management API 602 allows the HMS 102, 214 to integrate seamlessly with hardware from ODMs, OEMs, and other vendors independently of the HMS API 610 provided by the HMS 102, 214 for use by the PRM 518 to manage such non-disaggregated hardware.

The HMS APIs 610 of the illustrated example supports numerous Get/Set events so that the HMS 102, 214 can support requests from the PRM 518. Such Get/Set events will work on software server and switch object properties. Example Get/Set events of the HMS APIs 610 include:

```
PRM_HMS_ACK_HANDSHAKE ( )
PRM_HMS_GET_RACK_INVENTORY (Server Obj[ ], Switch
   Obj[ ],..)
PRM_HMS_GET_SERVER_OBJECT_PROP (Key, Value)
PRM_HMS_SET_SERVER_OBJECT_PROP (Key, Value)
PRM_HMS_GET_SWITCH_OBJECT_PROP (Key, Value)
PRM_HMS_SET_SWITCH_OBJECT_PROP (Key, Value)
```

In the above example Get/Set events of the generic HMS service APIs 610, the 'Key' is the property ID listed as part of the server/switch object properties. The example PRM_HMS_ACK_HANDSHAKE ( ) event API enables the PRM 518 to perform an acknowledgment-based handshake with the HMS 102, 214 to establish a connection between the PRM 518 and the HMS 102, 214. The example PRM_HMS_GET_RACK_INVENTORY (Server Obj[ ], Switch Obj[ ], . . . ) API enables the PRM 518 to request the HMS 102, 214 to provide the non-disaggregated hardware inventory of the physical rack 102, 204. The example PRM_HMS_GET_SERVER_OBJECT_PROP (Key, Value) API enables the PRM 518 to request a server object property from the HMS 102, 214. For example, the PRM 518 provides the 'Key' identifying the requested server object property ID, and the HMS 102, 214 returns the 'Value' of the requested server object property. The example PRM_HMS_SET_SERVER_OBJECT_PROP (Key, Value) API enables the PRM 518 to set a server object property via the HMS 102, 214. For example, the PRM 518 provides the 'Key' identifying the target server object property ID, and provides the 'Value' to set for the target server object property. The example PRM_HMS_GET_SWITCH_OBJECT_PROP (Key, Value) API enables the PRM 518 to request a switch object property from the HMS 102, 214. For example, the PRM 518 provides the 'Key' identifying the requested switch object property ID, and the HMS 102, 214 returns the 'Value' of the requested switch object property. The example PRM_HMS_SET_SWITCH_OBJECT_PROP (Key, Value) API enables the PRM 518 to set a switch object property via the HMS 102, 214. For example, the PRM 518 provides the 'Key' identifying the target switch object property ID, and provides the 'Value' to set for the target switch object property.

The PRM 518 of the illustrated example registers a set of callbacks with the HMS 102, 214 that the PRM 518 is configured to use to receive communications from the HMS 102, 214. When the PRM callbacks are registered, the HMS 102, 214 invokes the callbacks when events corresponding to those callbacks occur. Example PRM callback APIs that may be registered by the PRM 518 as part of the generic HMS service APIs 610 include:

PRM Callback APIs

```
HMS_PRM_HOST_FAILURE (Server Obj[ ], REASON CODE)
HMS_PRM_SWITCH_FAILURE (Switch Obj[ ], REASON CODE)
HMS_PRM_MONITOR_SERVER_OBJECT (Key, Value, Update
   Frequency)
HMS_PRM_MONITOR_SWITCH_OBJECT (Key, Value, Update
   Frequency)
```

The example HMS_PRM_HOST_FAILURE (Server Obj[ ], REASON CODE) callback enables the HMS 102, 214 to notify the PRM 518 of a failure of a host (e.g., a fixed physical server) in the physical rack 104, 204. The example HMS_PRM_SWITCH_FAILURE (Switch Obj[ ], REASON CODE) callback enables the HMS 102, 214 to notify the PRM 518 of a failure of a fixed physical switch of the physical rack 104, 204. The example HMS_PRM_MONITOR_SERVER_OBJECT (Key, Value, Update Frequency) callback enables the HMS 102, 214 to send monitor updates to the PRM 518 about a server object 632. In the illustrated example, 'Key' identifies the server object 632 to which the update corresponds, 'Value' includes the updated information monitored by the HMS 102, 214 for the server object 632, and 'Update Frequency' indicates the frequency with which the server object monitor update callbacks are provided by the HMS 102, 214 to the PRM 518. The example HMS_PRM_MONITOR_SWITCH_OBJECT (Key, Value, Update Frequency) callback enables the HMS 102, 214 to send monitor updates to the PRM 518 about a switch object 634. In the illustrated example, 'Key' identifies the switch object 634 to which the update corresponds, 'Value' includes the updated information monitored by the HMS 102, 214 for the switch object 634, and 'Update Frequency' indicates the frequency with which the switch object monitor update callbacks are provided by the HMS 102, 214 to the PRM 518.

The example HMS API 610 provide non-maskable event types for use by the HMS 102, 214 to notify the PRM 518 of failure scenarios in which the HMS 102, 214 cannot continue to function.

Non-Maskable Event HMS APIs

```
HMS_SOFTWARE_FAILURE (REASON CODE)
HMS_OUT_OF_RESOURCES (REASON CODE)
```

The example HMS_SOFTWARE_FAILURE (REASON CODE) non-maskable event API enables the HMS 102, 214 to notify the PRM 518 of a software failure in the HMS 102, 214. The example HMS_OUT_OF_RESOURCES (REASON CODE) non-maskable event API enables the HMS 102, 214 to notify the PRM 518 when the HMS 102, 214 is out of physical resources.

The HMS 102, 214 provides the example hardware management API 602 for use by the example HMS API 610 so that the HMS 102, 214 can communicate with the physical resources 224, 226 based on instructions received from the PRM 518 via the HMS API 610. The hardware management API 602 of the illustrated example interface with non-disaggregated physical resource objects using their corresponding management interfaces, some of which may be vendor-specific interfaces. For example, the HMS 102, 214 uses the hardware management API 602 to maintain managed server, switch, and storage software object properties. Example hardware management API 602 for accessing server objects are shown below in Table 2.

TABLE 2

| Server Hardware Management APIs | | |
|---|---|---|
| API | Return Value | Description |
| DISCOVER_SERVER_INVENTORY( )<br>A Node Object identifies a server hardware node<br>(Node ID, MAC Address, Management IP Address) | Node object list | Used to discover all servers in a rack. Homogeneous hardware assumption Board information required for hardware identification to attach to the right plugin. |
| GET_CHASSIS_SERIAL_NUMBER(NODE_OBJECT) | Chassis serial number | Used to get chassis identifier |
| GET_BOARD_SERIAL_NUMBER (NODE_OBJECT) | Board serial number | Used to get board identifier |
| GET_MANAGEMENT_MAC_ADDR (NODE_OBJECT) | MAC address | Used to get MAC address of management port |
| SET_MANAGEMENT_IP_ADDR(NODE_OBJECT, IPADDR) | RC (Success/ Error Code) | Used to set management IP address |
| GET_CPU_POWER_STATE(NODE_OBJECT) | CPU powerstate | Used to get current power state [S0-S5] of CPU |
| SET_CPU_POWER_STATE(NODE_OBJECT, POWERSTATE) | RC | Used to set CPU power state |
| SET_SERVER_POWER_STATE(ON/OFF/CYCLE/ RESET) | RC | Used to power on, power off, power cycle, reset a server Cold reset - BMC reset, run Self Test Warm Reset - No Self Test |
| GET_SERVER_CPU_PROPERTIES(NODE_OBJECT, CPU_OBJECT) | RC | Used to get CPU specific information |
| SET_SERVER_CPU_PROPERTIES(NODE_OBJECT, CPU_OBJECT) | RC | Used to set CPU properties |
| GET_SERVER_MEMORY_PROPERTIES(NODE_OBJECT, MEM_OBJECT) | RC | Used to get memory properties |
| GET_SERVER_NETWORKCONTROLLER_PROPERTIES (NODE_OBJECT, NETWORKCONTROLLER_OBJECT [ ]) | RC | Used to get Network controller properties including LOM, NICS |
| SET_SERVER_NETWORKCONTROLLER_PROPERTIES (NODE_OBJECT, NETWORKCONTROLLER_OBJECT[ ]) | RC | Used to set NIC properties |
| GET_SERVER_DISK_PROPERTIES(NODE_OBJECT, DISK_OBJECT[ ]) | RC | Used to get Disk properties |
| SET_SERVER_DISK_PROPERTIES(NODE_OBJECT, DISK_OBJECT[ ]) | RC | Used to set Disk properties |
| GET_SERVER_DISK_SMART_DATA(NODE_OBJECT, SMART_OBJECT) | RC | Used to get SMART data for disk |
| SET_SERVER_SENSOR (NODE_OBJECT, SENSOR, VALUE, THRESHOLD) | RC | Used to set sensors for CPU/Memory/Power/ HDD |
| GET_SENSOR_STATUS (NODE_OBJECT, SENSOR, VALUE, UNITS, THRESHOLD) | RC | Used to get sensor data |
| GET_SYSTEM_EVENT_LOG_DATA( . . . ) | Used to get System event log data | |
| UPDATE_CPU_FIRMWARE(FILE . . . ) | Update CPU firmware | |
| UPDATE_DISK_FIRMWARE(FILE . . . ) | Update Disk Firmware | |
| UPDATE_NIC_FIRMWARE(FILE . . . ) | Update NIC firmware | |
| SET_CHASSIS_IDENTIFICATION (NODE_OBJECT, ON/OFF, NUMSECS) | LED/LCD/BEEP | |
| SET_BOOTOPTION(NODE_OBJECT, TYPE) | RC | Used to set bootoption SSD/PXE |
| GET_BOOTOPTION(NODE_OBJECT) | BOOT TYPE | Used to get bootoption |
| SET_CREATE_USER (NODE_OBJECT, USEROBJECT) | RC | Used to create a management user |

Example hardware management APIs 602 for accessing switch objects are shown below in Table 3.

TABLE 3

Switch Hardware Management APIs

| API | Return Value | Description |
|---|---|---|
| GET_CHASSIS_SERIAL_ID(NODE_OBJECT) | CHASSIS_IDENTIFIER | Used to identify a ToR Switch chassis |
| GET_MANAGEMENT_MAC(NODE_OBJECT) | MAC_ADDRESS | API to get Management port MAC address |
| SET_MANAGEMENT_IP(NODE_OBJECT, IP ADDR) | RC | API to set management IP address |
| GET_SWITCH_INVENTORY(NODE_OBJECT) | SWITCH_INVENTORY | Used to get switch hardware inventory (HW, Power supply, Fans, Transceiver etc.) |
| SWITCH_REBOOT(NODE_OBJECT) | RC | Used to reboot the switch |
| CREATE_SWITCH_USER(NODE_OBJECT, USER_OBJECT) | RC | Used to create a management user |
| GET_SWITCH_VERSION(NODE_OBJECT) | VERSION_OBJECT | Used to get Hardware and software version details |
| GET_SWITCH_HW_PLATFORM (NODE_OBJECT) | HARDWARE_CHIPSET_OBJECT | Used to get the switching ASIC information |
| APPLY_SWITCH_CONFIGURATION (NODE_OBJECT, CONFIG_FILE) | CONFIG_STATUS_OBJECT | Used to apply running configuration on a switch |
| DELETE_SWITCH_CONFIGURATION (NODE_OBJECT) | RC | Used to delete startup switch configuration |
| SET_LOG_LEVELS (NODE_OBJECT, LOG_LEVEL) | RC | Used to set log levels for alert, events and debug from the switch |
| GET_SWITCH_ENVIRONMENT(NODE_OBJECT, POWER_OBJ, COOLING_OBJ, TEMPERATURE_OBJ) | RC | Used to get environmental information from the switch for power, fans and temperature. |

TABLE 3-continued

Switch Hardware Management APIs

| API | Return Value | Description |
| --- | --- | --- |
| SET_LOCATOR_LED(NODE_OBJECT) | RC | Used to set locator LED of switch |
| GET_INTERFACE_COUNTERS(NODE_OBJECT, INT_OBJECT) | RC | Used to collect interface statistics |
| GET_INTERFACE_ERRORS(NODE_OBJECT, INT_OBJECT) | RC | Used to collect errors on switch interfaces |
| GET_INTERFACE_STATUS(NODE_OBJECT, INT_OBJECT) | RC | Used to get interface status |
| SET_INTERFACE_STAUS(NODE_OBJECT, INT_OBJECT) | RC | Used to set interface status |
| GET_INTERFACE_PHY_STATUS(NODE_OBJECT, INT_OBJECT) | RC | Used to get physical status of interface |
| GET_INTERFACE_SPEED(NODE_OBJECT, INT_OBJECT") | RC | Used to get the speed/auto negotiation mode |
| GET_VLAN_SUMMARY(NODE_OBJECT, VLAN_OBJECT) | RC | Get VLAN information Number of VLAN in use and ports connected to. |
| GET_VLAN_COUNTERS(NODE_OBJECT, VLAN_OBJECT) | RC | Get VLAN specific counters |
| GET_VXLAN_TABLE(NODE_OBJECT, VXLAN_TABLE) | RC | VXLAN address table |
| GET_VXLAN_COUNTERS(NODE_OBJECT, VXLAN_OBJECT) | RC | VXLAN specific counters |
| CLEAR_VLAN_COUNTERS | RC | Clear VLAN counters |
| CLEAR_VXLAN_COUNTERS | RC | Clear VXLAN counters |
| MONITOR_LINK_FLAPS(NODE_OBJECT, INT_OBJECT) L3/MLAG/LAG STATUS | RC | Monitor link flaps |
| SET_PORT_MTU(NODE_OBJECT, MTU) | RC | Set Port MTU |
| SWITCH_OS_UPGRADE(FILE *) | RC | Ability to upgrade the OS on the switch |

In the illustrated example of FIG. 6, the PRM 518 maintains an example generic pRack object 624. The example generic pRack object 624 persists a list of non-disaggregated physical resources returned by the HMS 102, 214 and classified according to object types. The example generic pRack object 624 includes the following pRack object definition.
pRACK Object
Rack ID (Logical Provided by VRM 225, 227)
Manufacturer ID ( )
Number Server Objects
Server Object List 626
Switch Object List 628
HMS heartbeat timestamp In the pRack object definition above, the Rack ID is the logical identifier of the virtual server rack 206 (FIG. 2). The Manufacturer ID ( ) returns the identifier of the system integrator 104 (FIG. 1) that configured the virtual server rack 206. The 'Number Server Objects' element stores the number of server objects configured for the virtual server rack 206. The 'Server Object List' 626 element stores a listing of server objects configured for the virtual server rack 206. The 'Switch Object List' 628 element stores a listing of switch objects configured for the virtual server rack 206. The 'HMS heartbeat timestamp' element stores timestamps of when the operational status (e.g., heartbeat) of the virtual server rack 206 is checked during periodic monitoring of the virtual server rack 206.

The example PRM 518 provides the PRM-LRM interface 606 for use by the LRM 520 (FIG. 5) to access the elements described above of the pRACK object 624. In examples disclosed herein, the PRM 518 and the LRM 520 run in the same application. As such, the PRM 518 and the LRM 520 communicate with each other using local inter-process communication (IPC). Examples of Get/Set event APIs of the PRM-LRM interface 606 include:

Get/Set Event LRM APIs

---

LRM_PRM_RECIEVE_HANDSHAKE_ACK ( )
LRM_PRM_GET_RACK_OBJECT (PRM_RACK_OBJECT [ ])
LRM_PRM_SET_SERVER_OBJECT_PROP (Key, Value)
LRM_PRM_GET_SERVER_STATS (Available, InUse, Faults)
LRM_PRM_SET_SERVER_CONFIG
(SERVER_CONFIG_BUFFER)
LRM_PRM_SET_SWITCH_ADV_CONFIG
(SWITCH_CONFIG_BUFFER)

---

In the Get/Set Event LRM APIs, the example LRM_PRM_RECEIVE_HANDSHAKE_ACK ( ) API may be used by the LRM 520 to establish a connection between the LRM 520 and the PRM 518. The example LRM_PRM_GET_RACK_OBJECT (PRM_RACK_OBJECT [ ]) API may be used by the LRM 520 to obtain an identifier of the rack object corresponding to the virtual server rack 206. The example LRM_PRM_SET_SERVER_OBJECT_PROP (Key, Value) API may be used by the LRM 520 to set a server object property via the PRM 518. For example, the LRM 520 provides the 'Key' identifying the target server object property ID, and provides the 'Value' to set for the target server object property. The example LRM_PRM_GET_SERVER_STATS (Available, InUse, Faults) API may be used by the LRM 520 to request via the PRM 518 operational status of fixed physical servers of non-disaggregated physical resources. For example, the PRM 518 may return an 'Available' value indicative of how many fixed physical servers in the non-disaggregated physical resources are available, may return an 'InUse' value indicative of how many fixed physical servers in the non-disaggregated physical resources are in use, and may return a 'Faults' value indicative of how many fixed physical servers in the non-disaggregated physical resources are in a fault condition. The example LRM_PRM_SET_SERVER_CONFIG (SERVER_CONFIG_BUFFER) API may be used by the LRM 520 to set configuration information in fixed physical servers of the non-disaggregated physical resources. For example, the LRM 520 can pass a memory buffer region by reference in the 'SERVER_CONFIG_BUFFER' parameter to indicate a portion of memory that stores configuration information for a fixed physical server. The example LRM_PRM_SET_SWITCH_ADV_CONFIG (SWITCH_CONFIG_BUFFER) may be used by the LRM 520 to set configuration information in fixed physical switches of the non-disaggregated physical resources. For example, the LRM 520 can pass a memory buffer region by reference in the 'SWITCH_CONFIG_BUFFER' parameter to indicate a portion of memory that stores configuration information for a fixed physical switch.

The LRM 520 of the illustrated example registers a set of callbacks with the PRM 518 that the LRM 520 is configured to use to receive communications from the PRM 518. When the LRM callbacks are registered, the PRM 518 invokes the callbacks when events corresponding to those callbacks occur. Example callbacks that may be registered by the LRM 520 include:

LRM Callback APIs

---

PRM_LRM_SERVER_DOWN (SERVER_ID, REASON_CODE)
PRM_LRM_SWITCH_PORT_DOWN (SERVER_ID,
REASON_CODE)
PRM_LRM_SERVER_HARDWARE_FAULT (SERVER_ID,
REASON_CODE)

---

The example PRM_LRM_SERVER_DOWN (SERVER_ID, REASON_CODE) callback API enables the PRM 518 to notify the LRM 520 when a fixed physical server is down. The example PRM_LRM_SWITCH_PORT_DOWN (SERVER_ID, REASON_CODE) callback API enables the PRM 518 to notify the LRM 520 when a switch port is down. The example PRM_LRM_SERVER_HARDWARE_FAULT (SERVER_ID, REASON_CODE) callback API enables the PRM 518 to notify the PRM 518 to notify the LRM 520 when a fixed physical server hardware fault has occurred.

The example HMS APIs 610 provide non-maskable event types for use by the HMS 102, 214 to notify the PRM 518 of failure scenarios in which the HMS 102, 214 cannot continue to function.

Non-Maskable Event LRM APIs

---

PRM_SOFTWARE_FAILURE (REASON_CODE)
PRM_OUT_OF_RESOURCES (REASON_CODE)

---

The example PRM_SOFTWARE_FAILURE (REASON_CODE) non-maskable event API enables the PRM 518 to notify the LRM 520 when a software failure has occurred. The example PRM_OUT_OF_RESOURCES (REASON_CODE) non-maskable event API enables the PRM 518 to notify the LRM 520 when the PRM 518 is out of resources.

The HMS 102, 214 of the illustrated example includes the hardware composability API 604 to enable the PRM 518 to communicate with the disaggregated physical hardware resources 108, 226 of FIGS. 1-5. In the illustrated example, to communicate with and manage the disaggregated physical hardware resources 108, 226 of FIGS. 1-6, the HMS 102, 214 includes a HMS composability API 650 for use by original equipment manufacturers (OEMs) of disaggregated physical hardware resources to integrate hardware or software with the software stack of the virtual server rack 206. In the illustrated example, OEM disaggregated hardware is provided with vendor-specific plugin interfaces that may be developed for use by the hardware management API 602 to facilitate communications with disaggregated physical hardware resources 108, 226 of particular vendors having vendor-specific interfaces.

In the illustrated example, the HMS 102, 214 provides the example HMS composability APIs 650 for use by the PRM 518 to access use of virtual resources based on the disaggregated physical hardware resources 108, 226. In the illustrated example, the HMS composability APIs 650 are not specific to any particular vendor and/or hardware and are implemented using a REST/JSON (JavaScript object notation) API protocol. However, any other API protocol may be used. The example HMS composability APIs 650 communicate with underlying non-disaggregated physical hardware resources, which are encapsulated in a set of software objects such as an example SRUM CPU object 654, an example SRUM switch object 656, an example SRUM storage object 658, an example SRUM memory object 660, and/or an example SRU object 662. In the illustrated example, the HMS 102, 214 maintains the SRUM CPU object 654, the SRUM switch object 656, the SRUM storage object 658, the SRUM memory object 660, and the SRU object 662, and their associated properties. In the illustrated example, the HMS 102, 214 runs the HMS composability API 650 on the example server host node(0) 209, 211 (FIG. 2) to interface with the example PRM 518, with the example OEM plugin 612, and with the example RSA plugin 614. The example OEM plugin 612 and the example RSA plugin 614 operate as OOB communication agents to communicate with non-disaggregated physical hardware resources and the example disaggregated physical hardware resources 108, 226.

In the illustrated example, the HMS composability API 650 is capable of fine-granular discovery of disaggregated physical hardware resource inventory at the component level (e.g., SRUMs, CPUs, NICs, storage devices, memory devices, etc.) and is configured to push discovered disaggregated physical hardware resources to the PRM 518 and to receive composed elements (e.g., composed servers, composed switches, etc.) back from the PRM 518 that the PRM 518 built from the discovered disaggregated physical hardware resources. In this manner, the HMS composability API 650 is used for composability operations of the HMS 102, 214 and the PRM 518. When composed resources are built and returned by the PRM 518 to the HMS 102, 214, the composed resources are managed using the HMS API 610, which is the management interface to manage fixed physical resources and composed resources in the same way.

The example HMS 102, 214 internally maintains the hardware composability API 604 to service API requests received at the HMS composability API 650. The hardware composability API 604 of the illustrated example is vendor-specific and is implemented as a vendor-specific plugin to the HMS 102, 214. The hardware composability API 604 uses the OEM plugin 612 and the RSA plugin 614 to interface with vendor-specific plugin interfaces of the disaggregated physical hardware resources 108, 226 to communicate with the disaggregated physical hardware resources 108, 226 at a fine-granular component level (e.g., SRUMs, CPUs, NICs, storage devices, memory devices, etc.). For example, the hardware composability API 604 uses the OEM plugin 612 and the RSA plugin 614 exchange data between the HMS composability API 650 and the vendor-specific plugin interface of the disaggregated physical hardware resources 108, 226. Example vendor-specific interfaces may be proprietary to corresponding OEM vendors for hardware management. Regardless of whether the vendor-specific interfaces are proprietary, or part of an industry standard or open interface, the published hardware composability API 604 is configured to work seamlessly between the PRM 518 and the disaggregated physical hardware resources 108, 226 to manage the disaggregated physical hardware resources 108, 226. In examples disclosed herein, a single generic API interface (e.g., a REST API, a JSON API, etc.) implementing the example HMS composability API 650 is provided between the PRM 518 and the HMS 102, 214 to facilitate hiding all hardware and vendor specificities of disaggregated hardware management in the HMS 102, 214 and isolating the complexity of such hardware and vendor specificities from upper layer processes in the PRM 518 and/or the LRM 520.

In the illustrated example, the HMS 102, 214 uses the OEM plugin 612 and the RSA plugin 614 to communicate with the disaggregated physical hardware resources 108, 226 via an example rack level management module 668 and an example pooled system management engines 670. The example rack level management module 668 enables communication with the ToR switches 210, 212, 216, 218 for overall physical rack management by the HMS 102, 214. The example pooled system management engines 670 enable communications with the shared functions (e.g., the PSME function) of the SRUs of the disaggregated physical hardware resources 108, 226. After the HMS 102, 214 composes a composed server (e.g., the composed server 118 of FIG. 1), the example OEM plugin 612 and the example RSA plugin 614 communicate with the composed server node in the same manner as with fixed physical server nodes. In addition, the HMS 102, 214 uses the HW management API 602, the HMS API 610 and the server object 632 to configure and manage the composed server node in the same manner as with fixed physical server nodes.

To manage virtual resources based on composed servers (e.g., the composed server node 118 of FIG. 1) and/or SRUMs, the PRM 518 of the illustrated example exposes a physical rack disaggregated rack (pRACK DR) object 672 and its associated composed server list/SRUM list 674 in a generic vendor neutral manner to the example LRM 520. The example composed server list/SRUM list 674 includes lists of composed servers and SRUMs that are available for virtualizing and/or are already virtualized. The example PRM 518 communicates with the example HMS 102, 214 using the example HMS composability API 650 to manage the disaggregated physical hardware resources 108, 226 in the physical rack 104, 204, and to obtain information and inventory of the disaggregated physical hardware resources 108, 226 available in the physical rack 104, 204. In the illustrated example, the HMS 102, 214 executes instructions from the PRM 518 that are specific to underlying physical resources based on the hardware composability API 604 of those physical resources. That is, after the HMS 102, 214 receives an instruction via the HMS composability API 650 from the PRM 518 that corresponds to an action on a particular disaggregated physical hardware resource 108, 226 in the physical rack 104, 204, the HMS 102, 214 uses the example hardware composability API 604 to issue a corresponding instruction to the particular disaggregated physical resource using a hardware management API of that particular physical resource. In this manner, the PRM 518 need not be configured to communicate with numerous different APIs of different disaggregated physical resources in the physical rack 104, 204. Instead, the PRM 518 is configured to communicate with the HMS 102, 214 via the HMS composability API 650, and the HMS 102, 214 handles communicating with numerous different, specific APIs of different disaggregated physical resources through the example hardware composability API 602. By using the HMS composability API 650 for the PRM 518 to interface with and manage the disaggregated physical hardware resources 108, 226 through the HMS 102, 214, the physical racks 104, 204 may be configured or populated with disaggregated hardware from numerous different manufacturers without needing to significantly reconfigure the PRM 518. That is, even if such manufacturers require use of different APIs specific to their disaggregated equipment, the HMS 102, 214 is configured to handle communications using such different APIs without changing how the PRM 518 uses the HMS composability API 650 to communicate with the disaggregated physical resources 108, 226 via the HMS 102, 214. Thus, the separation of the example HMS composability API 610 from the example hardware composability API 604 allows the HMS 102, 214 to integrate seamlessly with hardware from ODMs, OEMs, and other vendors independently of the HMS composability API 650 provided by the HMS 102, 214 for use by the PRM 518 to manage such non-disaggregated hardware.

Figure 7:
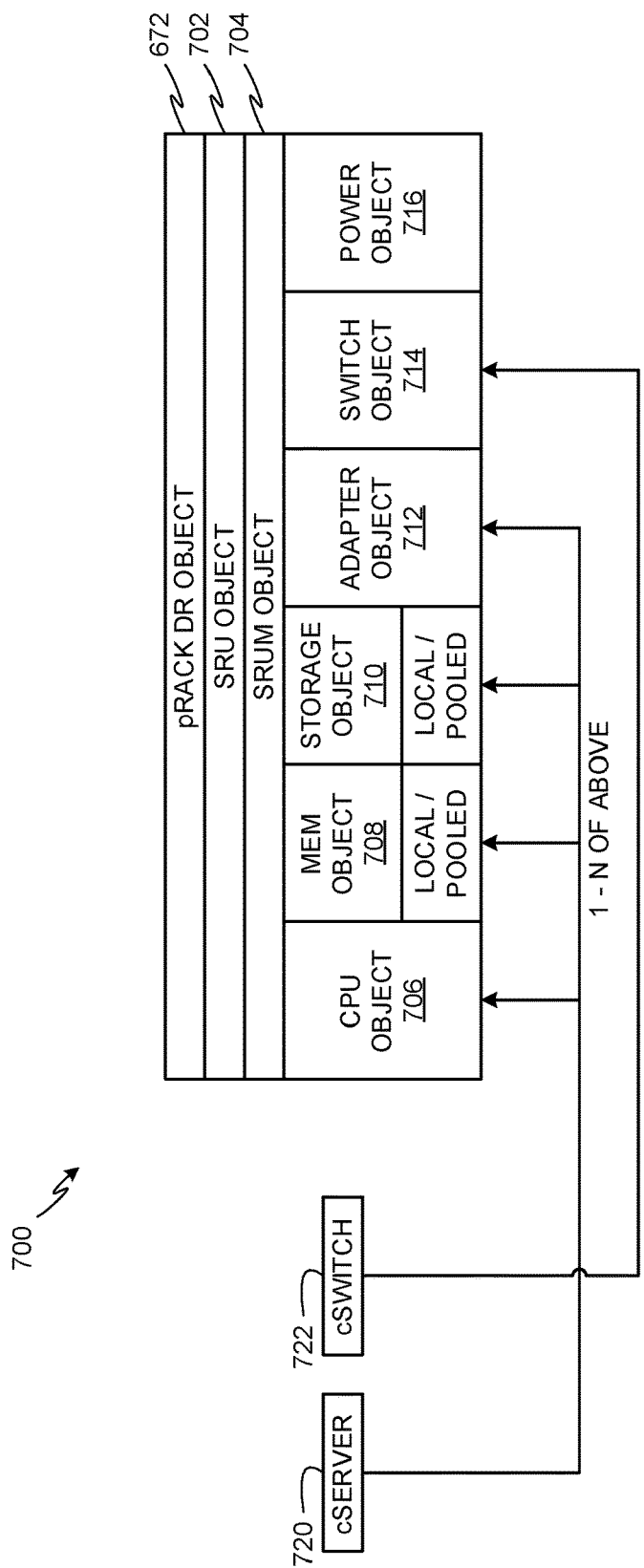
FIG. 7 depicts an example physical rack disaggregated rack (pRACK DR) object hierarchy of elements of an example pRACK DR object of the HMS of FIGS. 1-6.

In the illustrated example, the PRM 518 is provided with an example PRM composability interface 674 for use by the LRM 520 (FIG. 5) to access elements of the pRACK DR object 668. Turning to FIG. 7, elements of the example pRACK DR object 672 are shown in an example pRACK DR object hierarchy 700. Based on the example pRACK DR object hierarchy 700, the example pRACK DR object 672 can be used by the PRM 518 (FIGS. 5 and 6) to manage the disaggregated physical hardware resources 108, 226. In the illustrated example, the pRACK DR object 672 is the top level object in the PRM 518. The example pRACK DR object hierarchy 700 includes one or more SRU objects 702 (e.g. objects for trays or drawers). Each SRU object 702 includes one or more SRUM objects 704 (e.g., modules in the trays/drawers). In the illustrated example, a SRUM object 704 is composed of numerous physical objects that include one or more CPU objects 706, one or more memory objects 708, one or more storage objects 710, one or more adapter objects 712, one or more switch objects 714, and/or one or more power management module objects 716. The example physical objects 706, 708, 710, 712, 714, 716 are at the lowest level of the example pRACK DR object hierarchy 700. For example, the physical objects 706, 708, 710, 712, 714, 716 are the leaf nodes of the object tree defined by the example pRACK DR object hierarchy 700. An example property of a physical object is that it is enumerated as part of the hardware enumeration upon power up of the HMS 102, 214. In the illustrated example, the physical objects 706, 708, 710, 712, 714, 716 enable communicating with components to compose composed servers (cServers) 720 and composed switches (cSwitches) 722.

The tables below show example details of the example pRACK DR object 672, the physical objects 706, 708, 710, 712, 714, 716 of FIG. 7.

| pRack Object 672 | Description of Fields |
|---|---|
| Type | Disaggregated Rack Type |
| Rack Id | Unique Rack Identifier |
| SRU List | List of Sub Rack Units in the physical rack 104, 204 (e.g., trays/drawers) |
| SRUM List | List of Sub Rack Unit Modules in the rack |
| Management service object | Object to encapsulate management interfaces at the rack level - used to address the physical rack 104, 204 for management purposes (e.g., using an IP address of a REST endpoint). |
| ... | |

| SRU Object 702 | Sub rack unit object like a tray or a chassis |
|---|---|
| SRU ID | Unique Sub Rack unit identifier |
| Rack Id | Corresponding Rack Id of SRU (e.g., the physical rack 104, 204 that this SRU belongs to) |
| SRUM List | List of Sub Rack unit modules in the SRU |
| Management service object | Object to encapsulate management interface at SRU level (e.g., PSME [e.g., an IP address of a REST endpoint for the PSME]) |
| Admin State | Administrative status (e.g., desired status of SRU and its SRUMs such as whether a user has enabled the SRU to be part of a resource pool). |
| Operational State | Operational Status (e.g., actual state of the SRU - down/up). |
| Form Factor | Fixed/Pluggable |
| ... | |

| SRUM Object 704 | Sub Rack Unit module like a Sled for which may consist of leaf objects like CPU, Memory, Switch, Storage |
|---|---|
| SRUM ID | Unique Sub Rack Unit module identifier |
| SRU ID | Corresponding SRU ID of SRUM |
| Rack ID | Corresponding Rack Id of SRUM |
| SRUM Form Factor | Fixed/Pluggable |
| Admin State | Admin State - desired status of SRUM (e.g., whether the user has enabled it to be part of the resource pool) |
| Oper State | Operational State - actual state of the SRU (e.g., down/up). |
| pManifest[N] pManifest { Type of physical object pObject Points to the physical object } | Array of physical objects and types in a SRUM. (e.g., pCPU Object pMem Object pStorage Object pSwitch Object pPower Object pAdapter Object) |

Physical Objects

| pCPU Object 706 | Physical CPU object |
|---|---|
| SRUM ID | SRUM in which a CPU corresponding to this CPU object is located. |
| ID | ID of this pCPU object |
| pInterconnect ID[N] | The CPU is connected to the rest of the system using multiple interconnects. This array lists the full set of interconnects that this CPU acts as an end point for. Examples of interconnects are PCIe, Ethernet, SATA, SAS, proprietary ... |
| ... | |

| pMem Object 708 | Physical Memory object |
|---|---|
| SRUM ID | SRUM in which a memory corresponding to this memory object is located. |
| ID | ID of this pMem object |
| pInterconnect ID[N] | The memory is connected to the rest of the system using multiple interconnects. This array lists the full set of interconnects for which this pMem acts as an end point. Examples of interconnects for memory include direct attached. |
| SMC accessible? | Y/N |
| Type | Volatile, Persistent |
| ... | |

| pStorage Object 710 | Physical Storage object - this could be a spinning disk, flash, or any type of persistent storage. |
|---|---|
| SRUM ID | SRUM in which a storage component associated with which this Storage object is located |
| ID | ID of this pStorage object |

| | -continued |
|---|---|
| pInterconnect ID[N] | The Storage object is connected to the rest of the system using multiple interconnects. This array lists the full set of interconnects for which this pStorage acts as an end point. Examples of interconnects for Storage include SATA, SAS, PCIe, etc. |
| Type | SSD, HDD, Flash |
| . . . | |

| | |
|---|---|
| pAdapter Object 712 | Physical adapter object - NIC adapter, Storage Adapter |
| SRUM ID | SRUM in which a NIC associated this object is located. (In the case of a shared NIC such as on Intel RSA, the SRUM ID is the SRU ID.) |
| ID | ID of the Adapter Object |
| pInterconnect ID[N] | The Adapter object is connected to the rest of the system using multiple interconnects. This array lists the full set of interconnects for which this pAdapter acts as an end point. Examples of interconnects for adapters include PCIe, direct connected (e.g., integrated NIC on CPU), FC, SATA, etc. |
| External Interface Type | Ethernet, FC, SATA, SAS, SCSI, Internal, Converged, etc. |

| | |
|---|---|
| pSwitch Object 714 | Physical switch object |
| SRUM ID | SRUM in which a switch associated with this object is located. In the case of the RRC on Intel RSA, it is actually the SRU ID |
| Switch ID | UID of physical switch object |
| Switch Management IP | Management IP to manage the switch |
| Switch Object | Inherited from base HMS switch obj |
| pInterconnect ID [N] | The Switch object is connected to the rest of the system using multiple interconnects. This array lists the full set of interconnects that this switch acts as an end point for. There is only one type of interconnect for the switch - Ethernet |

| | |
|---|---|
| pInterconnect object | Maps the global connectivity between physical endpoints |
| UID | SRUM in which Interconnect component associated with this object is located. |
| Type | Type of interconnect (e.g., PCIe, SATA, StormLake etc.) |
| Physical Properties | Properties of the interconnect type |
| InterConnect Topology | Bus, Point-to-Point, Ring, Star etc. |

| | |
|---|---|
| Global Interconnect map [IMAP] IMAP [N] IMAP { Endpoint1, Endpoint2, Interconnect ID } | Maps the global connectivity between physical endpoints Endpoint is the UID to identify physical objects. Interconnect ID identifies the specific interconnect that the two endpoints are connected by. Examples include a pCPU UID for Endpoint1 and a pMem UID for Endpoint 2 with the Interconnect ID expressing the specific interconnect object used to connect them |
| . . . | |

When implementing the above object definitions in an actual physical system, some of the interconnect objects are read-only (e.g., the two enumerated (physical) end points (leaf objects) are already physically connected without composability). The object model of the example pRACK DR object 672 is capable of handling such cases as well as the completely composable building block model (e.g., any CPU can be connected to any memory, any storage, and/or any other disaggregated physical hardware component).

Composed Objects

In examples disclosed herein, composed resources such as the composed server cServer 720 and the composed switch cSwitch 722 of FIG. 7 are managed by the HMS 102, 214 using composed objects created from individual physical objects described above. For example, the composed servers 118 (FIG. 1), the composed server 720, and the composed switch 722 are built using composed objects. For example, the HMS 102, 214 performs discovery and composition of such composed resources by discovering physical objects with fine granularity (e.g., component-level discovery to discover CPU components, storage components, network components, memory components, etc.). The example PRM 518 uses the discovered components to build composed resources. In examples disclosed herein, after composition of a composes resource, the HMS 102, 214 will not distinguish between a fixed physical resources (e.g., a fixed physical server) and a composed resource (e.g., a composed server). As such, the HMS 102, 214 manages fixed physical resources and composed resources in the same way. The tables below show example details of composed objects.

| | |
|---|---|
| cServer | Composed Server Object |
| cServer ID | UID to identify a composed server |
| cCPU Obj | Composed CPU object made up of N physical CPU objects |
| cMem Obj | Composed Memory Objects made up of N local or pooled Memory objects |
| cAdapter Obj | Composed adapter object made up of N adapter objects |
| cStorage Obj | Composed Storage Objects made up of N local or pooled Disk objects or volumes |
| Interconnect topology object Refer virtual hardware spec VMM | |
| . . . | |

| | |
|---|---|
| cCPU Object | Composed CPU Object |
| cCPU ID | UID to identify a cCPU object |
| pCPU Container | Physical CPU object Container |
| . . . | |

| | |
|---|---|
| cMem Object | Composed Memory Object |
| cMem ID | UID to identify a Composed Memory object |
| pMem Container | Physical Memory object container |
| . . . | |

| | |
|---|---|
| cAdapter Object | Composed NIC Object |
| cAdapter ID | UID to identify a composed NIC object |
| pAdapter Container | Physical Adapter object Container |
| . . . | |

| | |
|---|---|
| cStorage Object | Composed Storage Object |
| cStorage ID | UID to identify a Storage object |
| pStorage Container | Physical Storage object Container |

| | |
|---|---|
| cSwitch object | Composed Switch Object |
| cSwitch ID | UID to identify a Switch object |
| pSwitch Container | Physical Switch object Container |
| ... | |

| | |
|---|---|
| cServer Interconnect map | Map the connectivity between physical objects in a composed server e.g., <br> CPU ID 0------PCIe------NIC ID 1 <br> CPU ID 0------SATA------DISK ID 1 <br> CPU ID 0------StormLake------CPU ID 1 |
| MAP [Endpoint1, Interconnect ID] [Endpoint2, Interconnect ID] ... | Endpoint1 is the UID to identify pCPU, pMem, pDisk, pNIC objects. Interconnect ID identifies the particular interconnect of the endpoint |

The below tables describe an example RSA plugin architecture that may be used to implement the example RSA plugin 614 (FIG. 6) of the HMS 102, 214 to perform DRA management.

Software APIs

| | |
|---|---|
| Discovery | APIs to discover PSMEs in a rack |
| Discovery | APIs to discover SRUs and SRUMs |
| Power on/off/cycle | APIs to power on SRUs/SRUMs |
| Boot Options | APIs to configure boot selectors (Network, SSD, Flash, etc.) |
| CPU | APIs to get CPU properties in a sled |
| MEM | APIs to get Memory properties a sled |
| Storage | APIs to get Storage Properties in a sled |
| NIC | APIs to get NIC Properties in a sled |
| COMPOSABILITY | APIs to compose defaults for server/switch |
| Management IP | APIs to get/set management IP. |
| Management User | APIs to create user credential for management |
| Sensors | APIs to get sensor data |
| Id Handles | APIs to retrieve identification for SRUs, SRUMs |
| SRUM types | APIs to get type of SRUMS |
| Switch Discover | APIs to discover switches in a Rack |
| Switch Management IP | API to get/set switch management IP |
| Switch Configuration | APIS to get and set switch configuration |
| Switch port properties | APIs to get/set switch port properties |
| Switch Power | APIs to power on/off switch |
| Switch OS boot | API to specify boot OS image for switch |

Hardware Features

| | |
|---|---|
| Management Switch | Ability to provision a management switch in a DR and be able to connect OOB to HW management entities from the switch over Ethernet (PSME/RMM/etc.) |
| Management Ports | For SRU Trays and Switches |

While an example manner of implementing the HMS 102, 214 using the management switch 112, 213 of FIGS. 1 and 2 is shown in FIG. 6, one or more of the elements, processes and/or devices illustrated in FIG. 6 may be combined, divided, re-arranged, omitted, eliminated and/or implemented in any other way. Further, the example HMS 102, 214, portions thereof and/or, more generally, the example management switch 112, 213 may be implemented by hardware, software, firmware and/or any combination of hardware, software and/or firmware. Thus, for example, the example HMS 102, 214, portions thereof and/or, more generally, the example management switch 112, 213 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example HMS 102, 214, portions thereof and/or, more generally, the example management switch 112, 213 is/are hereby expressly defined to include a tangible computer readable storage device or storage disk such as a memory, a digital versatile disk (DVD), a compact disk (CD), a Blu-ray disk, etc. storing the software and/or firmware. Further still, the example management switch 112, 213 of FIGS. 1 and 2 may include one or more elements, processes and/or devices in addition to, or instead of, those illustrated in FIG. 6, and/or may include more than one of any or all of the illustrated elements, processes and devices.

Figure 8:
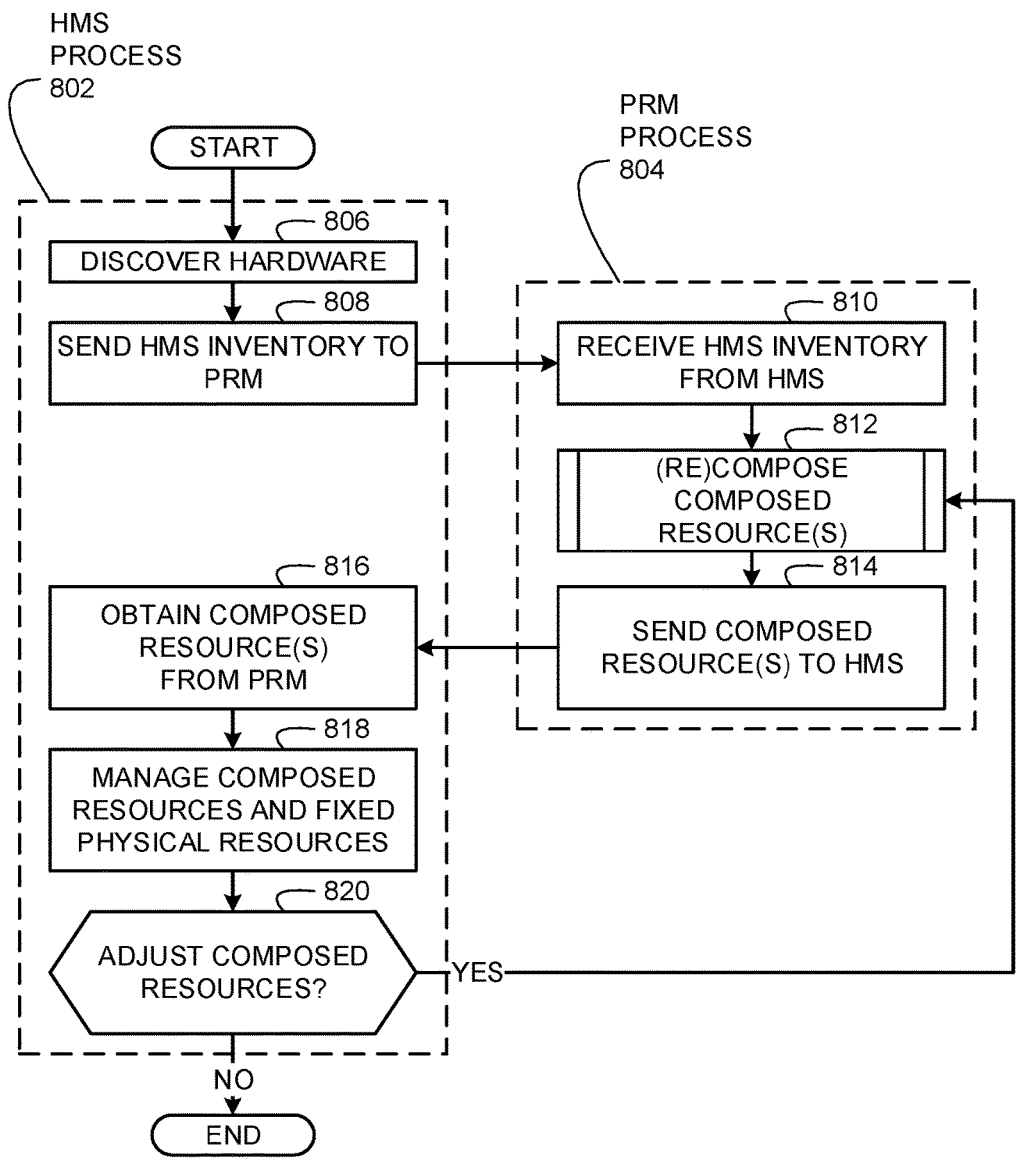
FIG. 8 is a flowchart representative of example machine readable instructions that may be executed to implement the example HMS of FIGS. 1-6 and the example PRM of FIGS. 5 and 6.

FIG. 8 is a flowchart representative of example machine readable instructions that may be executed to implement the example HMS 102, 214 of FIGS. 1-6 and the example PRM 518 of FIGS. 5 and 6. In the illustrated example, the machine readable instructions include one or more programs for execution by one or more processors such as the processor 912 shown in the example processor platform 900 discussed below in connection with FIG. 9. The program(s) may be embodied in software stored on a tangible computer readable storage medium such as a CD-ROM, a floppy disk, a hard drive, a digital versatile disk (DVD), a Blu-ray disk, or a memory associated with the processor 912, but the entire program(s) and/or parts thereof could alternatively be executed by a device other than the processor 912 and/or embodied in firmware or dedicated hardware. Further, although the example program(s) is/are described with reference to the flowchart illustrated in FIG. 8, many other methods of implementing the example HMS 102, 214 and/or the PRM 518 may alternatively be used. For example, the order of execution of the blocks may be changed, and/or some of the blocks described may be changed, eliminated, or combined.

The example flow chart of FIG. 8 includes an example HMS process 802 and an example PRM process 804. The example HMS process 802 is performed by the example HMS 102, 214. The example PRM process 804 is performed by the example PRM 518. As such, machine readable instructions to perform the example HMS process 802 may be separate from machine readable instructions to perform the example PRM process 804. For example, if the HMS 102, 214 and the PRM 518 are implemented in different devices, separate machine readable instructions for the HMS 102, 214 and the PRM 518 may be executed in the respective devices. Alternatively, the machine readable instructions may be executed in the same device by, for example, the same processor(s) in instances in which the HMS 102, 214 and the PRM 518 are executed in the same device.

The example instructions of FIG. 8 are described in connection with the disaggregated physical hardware resources 108, 226 of FIGS. 1-5 and in connection with composed resources (e.g., the composed server node 118 of FIG. 1, the composed server 720 of FIG. 7, and the composed server 722 of FIG. 7). However, the example instructions of FIG. 8 may be used in connection with processes performed by the HMS 102, 214 and the PRM 518 to discover, configure, and manage non-disaggregated fixed physical hardware resources.

The example instructions of FIG. 8 begin at the HMS process 802 in which the HMS 102, 214 discovers physical hardware resources (block 806). For example, the HMS 102, 214 uses the hardware composability API 604 (FIG. 6) to discover components of the disaggregated physical hardware resources 108, 226 (FIGS. 1-5) to generate an HMS inventory of the disaggregated physical hardware resources 108, 226. The example HMS 102, 214 sends the HMS inventory to the example PRM 518 (block 808). For example, the HMS 102, 214 may use the HMS composability API 650 (FIG. 6) to send (e.g., push) the HMS inventory to the PRM 518 via the HMS interface 502 (FIGS. 5 and 6) of the VRM 225, 227 (FIG. 5).

In the example PRM process 804, the PRM 518 receives the HMS inventory from the HMS 102, 214 (block 810). For example, the PRM 518 may use the pRACK DR object 672 to receive and process the HMS inventory. For example, the pRACK DR object 672 may associate objects described above in connection with FIG. 7 with ones of the disaggregated physical hardware resources 108, 226 identified in the HMS inventory. The example PRM 518 composes and/or recomposes one or more composed resources (block 812). For example, the PRM 518 uses the objects described above in connection with FIG. 7 to build one or more composed resources such as the composed server 720, the composed switch 722, and/or any other type of composed resource based on the disaggregated physical hardware resources 108, 226 identified in the HMS inventory. Additionally or alternatively, the example PRM 518 allocates and/or deallocates the disaggregated physical hardware resources 108, 226 to recompose a composed resource (e.g., configure a recomposed instance of the composed resource). In the illustrated example, the PRM 518 stores information about the composed resources in the composed server list/SRUM list 674 (FIG. 6). The example PRM 518 sends the composed resource(s) to the HMS 102, 214 (block 814). For example, the PRM 518 can send identifiers and properties described above in connection with FIG. 7 about the composed resource(s) (e.g., a newly composed resource or a recomposed instance of an existing composed resource) to the HMS 102, 214 using the HMS interface 502.

In the example HMS process 802, the HMS 102, 214 obtains the composed resource(s) from the PRM 518 (block 816). For example, the HMS 102, 214 may use the HMS composability API 650 to receive identifiers and properties described above in connection with FIG. 7 about the composed resource(s) (e.g., a newly composed resource or a recomposed instance of an existing composed resource). The example HMS 102, 214 manages composed resources and fixed physical resources (block 818). For example, the HMS 102, 214 uses the OEM plugin 612, the RSA plugin 614, the hardware management API 602, the HMS API 610, the server object 632, the switch object 634, and the storage object 636 to manage composed resources and fixed physical resources in the same way. The example HMS 102, 214 determines whether the composed resource(s) need to be adjusted (block 820). For example, based on workload demand, one or more composed resources may be underutilized or over-utilized. If the example HMS 102, 214 determines that the composed resource(s) need to be adjusted (block 820: YES), control returns to block 812. Otherwise (block 820: NO), the example instructions of FIG. 8 cease operation.

Figure 9:
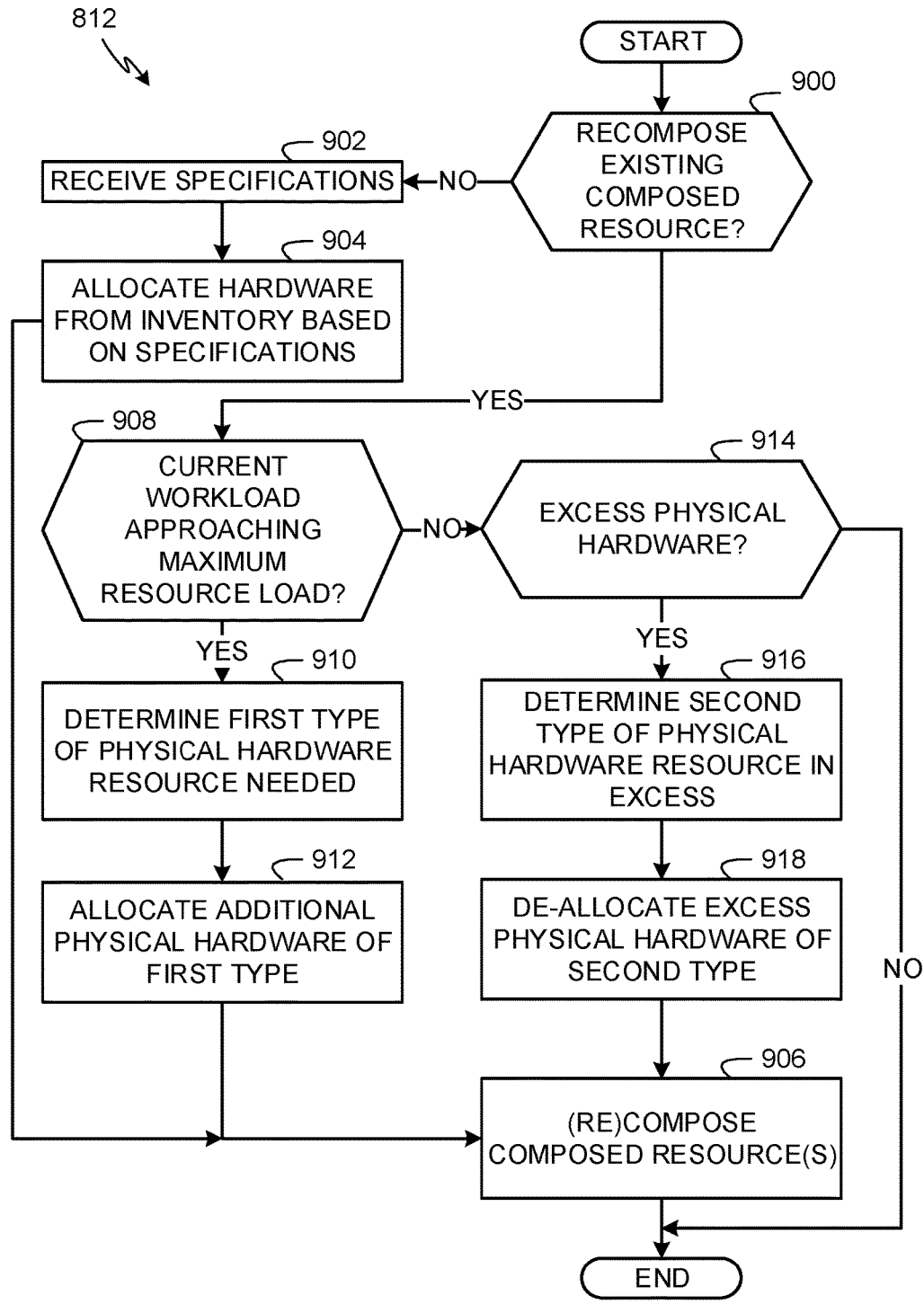
FIG. 9 is a flowchart representative of example machine readable instructions that may be executed to implement the example PRM of FIGS. 5 and 6 to compose and/or re-compose composed resources in accordance with the teachings of this disclosure.

FIG. 9 is a flowchart representative of example machine readable instructions that may be executed to implement the example PRM 518 of FIGS. 5 and 6 and block 812 of FIG. 8 to compose and/or recompose composed resources. In some examples, the instructions of FIG. 9 are used to (re)compose composed resources in real-time during operation of a workload. For example, a composed resource may be recomposed as the workload begins to exceed a current storage capacity of the composed resource. The example instructions begin at block 900. At block 900, the example PRM 518 determines whether it is to recompose an existing resource. If the example PRM 518 determines that it is not to recompose an existing composed resource (block 900: NO), control proceeds to block 902. At block 902, the example PRM 518 receives specifications for one or more composed resources to be composed. In some examples, the PRM 518 receives specification from customers (e.g., data center operators) through the operations and management layer 406 (FIG. 4). For example, a customer specifies what and/or how many components of the disaggregated physical hardware resources 108, 226 are needed. In some examples, a customer only specifies functions, operations and/or processes that the resource(s) are to perform. In such examples, the PRM 518 identifies the components of the disaggregated physical hardware resources 108, 226 required for such functions, operations and/or processes. Thereafter, the example PRM 518 allocates components of the disaggregated physical hardware resources 108, 226 from the HMS inventory received from the HMS 102, 214 based on the specifications (block 904). The example PRM 518 composes one or more composed resources based on the allocated components of the disaggregated physical hardware resources 108, 226 from block 904 (block 906). Thereafter, the example instructions of FIG. 9 cease operation.

However, if the example PRM 518 determines that it is to recompose a composed resource (block 900: YES), control proceeds to block 908. At block 908, the example PRM 518 determines whether the composed resource is executing a workload that is currently approaching a maximum capacity (e.g., load) of the physical hardware resources of the composed resource. If the example PRM 518 determines that the composed resource is executing a current workload approaching a maximum resource load (block 908: YES), then control proceeds to block 910. At block 910, the example PRM 518 determines a first type of physical hardware resource required to reduce the load. For example, if the example composed resource is reaching a maximum network load, the example PRM 518 determines the first type of physical hardware resource needed is a network resource (e.g., one of the pooled network resources 108*b* of FIG. 1). Additionally or alternatively, the example PRM 518 similarly determines the first type of physical hardware resource needed is a CPU resource (e.g., one of the pooled compute resources 108*a* of FIG. 1) when processing load is reaching a maximum processing load, a storage resource (e.g., one of the pooled storage resources 108*c* of FIG. 1) when a storage load is reaching a maximum storage load, etc.

Thereafter, the example PRM 518 allocates additional physical hardware resources of the first type (block 912). In some examples, the PRM 518 determines which physical hardware resources to allocate from the disaggregated physical hardware resources 108, 226 based on efficiency. For example, on-rack (or first rack) storage is preferred over off-rack (or second rack) storage, because of potential timing delays associated with increased physical distances between components. In some examples, a composed resource includes physical hardware resources that are located in separate racks (e.g., a storage resource from a first physical rack and a CPU resource from a second physical rack). In some examples, physical hardware resources are allocated from another composed resource (e.g., a composed resource with excess physical hardware resources). In some examples, physical hardware resources are frequently (re)allocated between composed resources based on applications the composed resources are executing. For example, a first composed resource may be associated with a first application with a high demand, and thus, may have a higher priority to physical hardware resources than a second application associated with a second composed resource. In such examples, physical hardware resources are re-allocated from the second composed resource to the first composed resource. In some examples, the re-allocated resources are returned to the second composed resource after the first composed resource ha finished executing the first application. The example PRM 518 recomposes one or more composed resources based on the allocated additional components of the disaggregated physical hardware resources 108, 226 from block 912 (block 906).

However, if the example PRM 518 determines that the composed resource is executing a current workload that is not approaching a maximum resource load (block 908: NO), then control proceeds to block 914. At block 914, the example PRM 518 determines whether the composed resource has excess physical hardware (e.g., physical hardware that is not being utilized). For example, the PRM 518 compares workloads executed by the composed resource to a minimum threshold (e.g., 10%), and, if the workload does not exceed the minimum threshold for a threshold amount of time (e.g., hourly, daily, weekly, etc.), the PRM 518 determines that excess resources are associated with the composed resource. If the example PRM 518 determines that the composed resource has excess physical hardware (block 914: YES), then control proceeds to block 916. Otherwise (block 914: NO), the example instructions of FIG. 9 cease operation.

At block 916, the example PRM 518 determines a second type of physical hardware resource that is in excess. For example, if the PRM 518 determines that, for the threshold amount of time, a network load of the composed resource does not frequently exceed 10 percent of maximum network capacity, the PRM 518 determines that the second type of physical hardware resource in excess is network resources (e.g., one of the pooled network resources 108b of FIG. 1). Additionally or alternatively, the example PRM 518 similarly determines the second type of physical hardware resource is a CPU resource (e.g., one of the pooled compute resources 108a of FIG. 1) when a processing load is below a minimum threshold, and/or a storage resource (e.g., one of the pooled storage resources 108c of FIG. 1) when a storage load is below a minimum threshold.

Thereafter, the example PRM 518 de-allocates excess physical hardware resources of the second type (block 918). In some examples, physical hardware resources are de-allocated from one composed resource (e.g., a composed resource with excess physical hardware resources) to allocate to another composed resource (e.g., a composed resource requiring additional physical resources). In some examples, physical hardware resources are frequently (re)allocated between the composed resources based on applications the composed resources are executing as disclosed above. The example PRM 518 recomposes one or more composed resources based on the de-allocated excess components of the disaggregated physical hardware resources 108, 226 from block 918 (block 906). Thereafter, the example instructions of FIG. 9 cease operation. The example instructions of FIG. 9 may be repeated as often as composed resources need to be composed and/or recomposed based on changes in workloads.

As mentioned above, the example processes of FIG. 8 and FIG. 9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 8 an FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Additionally, the terms "include, "includes," and "including," are open ended similarly to the terms "comprise," "comprises," and "comprising."

Figure 10:
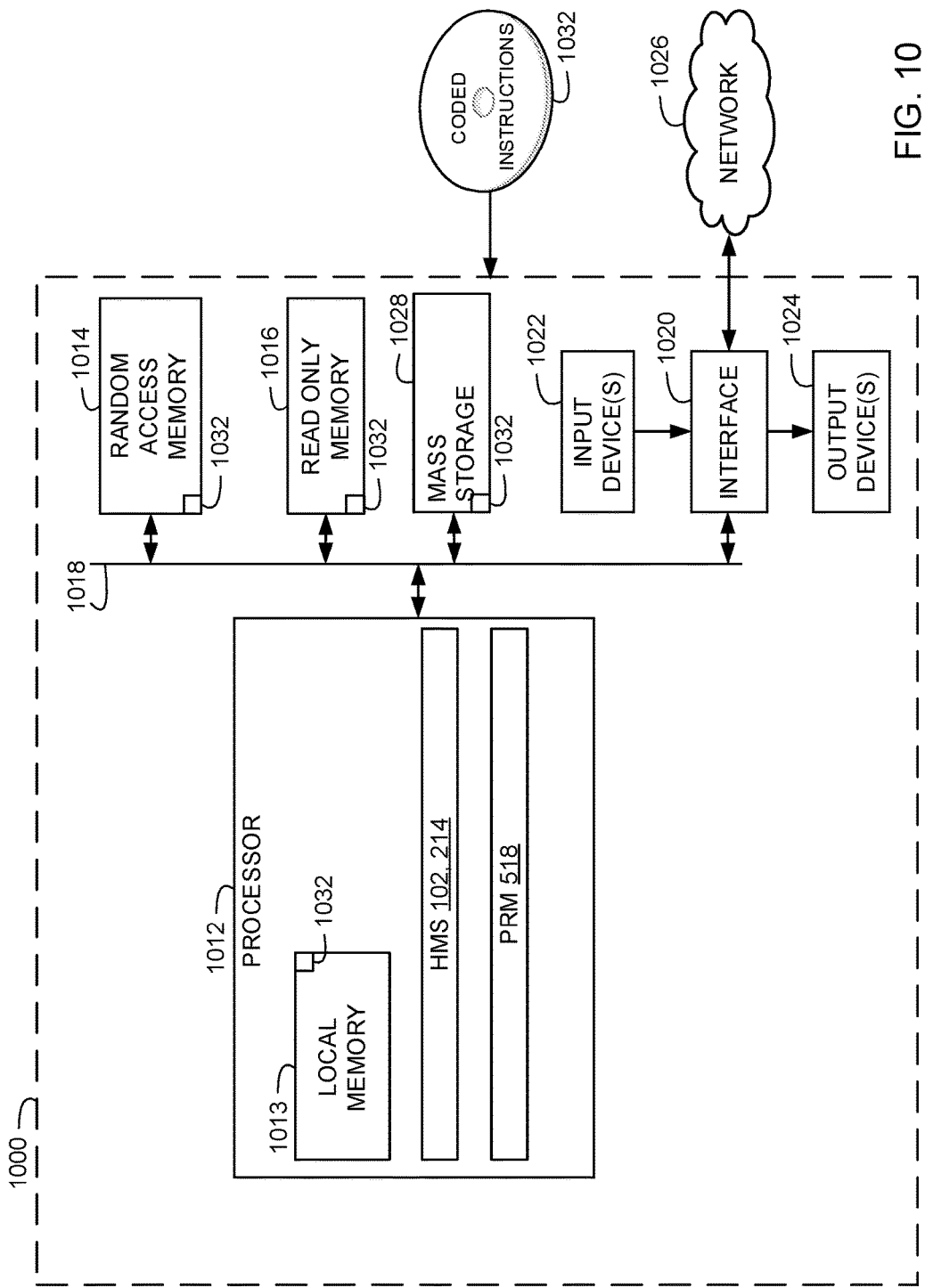
FIG. 10 is a block diagram of an example processing platform capable of executing the example machine-readable instructions of FIG. 8 and/or the example machine-readable instructions of FIG. 9 to implement the example HMS of FIGS. 1-6 and/or the example PRM of FIGS. 5 and 6.

FIG. 10 is a block diagram of an example processor platform 900 capable of executing the instructions of FIG. 8 and the example machine-readable instructions of FIG. 9 to implement the example HMS 102, 214 of FIGS. 1-6 and the example PRM 518 of FIGS. 5 and 6. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example HMS 102, 214 and the example PRM 518. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIG. 8 and/or the example machine-readable instructions of FIG. 9 may be stored in the mass storage device 1028, in the volatile memory 1014, in the non-volatile memory 1016, and/or on a removable tangible computer readable storage medium such as a CD or DVD.

From the foregoing, it will be appreciated that the above disclosed methods, apparatus and articles of manufacture facilitate the configuration of a virtual server rack based on a disaggregated rack architecture. For example, using the example techniques disclosed herein, an HMS can be used to implement and manage a virtual server rack based on disaggregated physical hardware resources in a more flexible and efficient manner than virtual server racks that are based solely on non-disaggregated physical hardware resources. For example, during a discovery process, the HMS discovers disaggregated physical hardware components such as CPUs, memory devices, NICs, etc. in different SRUs and SRUMs. The HMS then uses CPU objects, memory objects, storage objects, switch objects, adapter objects, power objects, etc. to store properties and SRU/SRUM locations of the discovered disaggregated physical hardware components. In this manner, the HMS can provide properties stored in the objects to a PRM to build composed resources. The composed resources can be flexibly and efficiently managed by the HMS due to the disaggregated physical hardware resources because the composed resources can be re-configured, updated, upgraded, downgraded at any time without needing to re-discover new hardware. For example, when the HMS detects that an additional server resource, CPU resource, memory resource, etc. is needed, the HMS can work with the PRM to upgrade an existing composed resource and/or to build a new composed resource from previously discovered disaggregated physical hardware resources. As such, the HMS and the PRM decrease the number of processing cycles and time needed to provide additional needed resources for use by a virtual server rack to provide virtual services and/or cloud services. In addition, the techniques disclosed herein enable using the HMS and PRM to build composed resources (e.g., a composed server) of any desired processing capabilities, storage capabilities, and/or network communication capabilities based on the aspect that the composed resources are built using separate components (e.g., CPUs, memory, NICs, etc.) that are configurable to communicate with one another via a local network of a physical rack.

Methods, apparatus, and articles of manufacture to configure hardware management systems for disaggregated rack architectures in virtual server rack deployments are disclosed herein. An example method to manage disaggregated physical hardware resources in a physical rack includes discovering, with a hardware management system, disaggregated physical hardware resources in the physical rack. The example method also includes sending an inventory of the disaggregated physical hardware resources from the hardware management system to a physical resource manager. The example method also includes receiving, from the physical resource manager, a composed resource at the hardware management system. The composed resource is generated by the physical resource manager based on ones of the physical hardware resources from the inventory of the disaggregated physical hardware resources.

In some examples, the discovering of the disaggregated physical hardware resources includes identifying at least one of disaggregated processors, disaggregated memory resources, disaggregated storage resources, or disaggregated networking resources.

In some examples, the method further includes receiving a recomposed instance of the composed resource, the recomposed instance generated by the physical resource manager to at least one of allocate additional physical hardware resources to the composed resource or de-allocate excess physical hardware resources from the composed resource.

In some examples, the receiving of the recomposed instance of the composed resource occurs in response to a change in a workload executed by the composed resource.

In some examples, the receiving of the recomposed instance of the composed resource occurs in real time while the composed resource is executing a workload.

In some examples, the composed resource is a first composed resource and the recomposed instance of the first composed resource includes physical hardware resources re-allocated from a second composed resource to the first composed resource when the first composed resource is associated with a first application having a higher priority than a second application associated with the second composed resource.

In some examples, the physical rack is a first physical rack and the recomposed instance of the composed resource includes physical hardware resources that are located in the first physical rack and a second physical rack.

An example apparatus to manage disaggregated physical hardware resources in a physical rack includes a hardware management system to discover disaggregated physical hardware resources in the physical rack and generate a listing of the disaggregated physical hardware resources.

The example apparatus also includes a physical resource manager to generate a composed resource based on resources from the listing of the disaggregated physical hardware resources. In such examples, the hardware management system is to manage the composed resource.

In some examples, the hardware management system is to identify at least one of disaggregated processors, disaggregated memory resources, disaggregated storage resources, or disaggregated networking resources.

In some examples, the physical resource manager is to recompose the composed resource to at least one of allocate additional physical hardware resources or de-allocate excess physical hardware resources.

In some examples, the physical resource manager is to recompose the composed resource in response to a change in a workload executed by the composed resource.

In some examples, the physical resource manager is to recompose the composed resource in real time while the composed resource executes a workload.

In some examples, the composed resource is a first composed resource and the physical resource manager is to re-allocate physical hardware resources from a second composed resource to the first composed resource when the first composed resource is associated with a first application having a higher priority than a second application associated with the second composed resource.

In some examples, the physical resource manager is to re-allocate physical hardware resources that are in separate physical racks.

An example tangible computer readable storage medium comprising instructions that, when executed, cause a machine to at least discover disaggregated physical hardware resources in a physical rack. The example instructions also cause the machine to send an inventory of the disaggregated physical hardware resources to a physical resource manager. The example instructions also cause the machine to receive a composed resource from the physical resource manager. In such examples, the composed resource is generated by the physical resource manager based on ones of the physical hardware resources from the inventory of the disaggregated physical hardware resources.

In some examples, the instructions, when executed, cause the machine to identify at least one of disaggregated processors, disaggregated memory resources, disaggregated storage resources, or disaggregated networking resources.

In some examples, the instructions, when executed, cause the machine to receive a recomposed instance of the composed resource, the recomposed instance generated by the physical resource manager to at least one of allocate additional physical hardware resources to the composed resource or de-allocate excess physical hardware resources from the composed resource.

In some examples, the instructions, when executed, cause the machine to receive the recomposed instance of the composed resource in response to a change in a workload executed by the composed resource.

In some examples, composed resource is a first composed resource and the recomposed instance of the first composed resource includes physical hardware resources re-allocated from a second composed resource to the first composed resource when the first composed resource is associated with a first application having a higher priority than a second application associated with the second composed resource.

In some examples, the physical rack is a first physical rack and the recomposed instance of the composed resource includes physical hardware resources that are located in the first physical rack and a second physical rack.

Examples of hardware management systems for disaggregated rack architectures in virtual server rack deployments have been disclosed above and in the corresponding figures. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage disaggregated physical hardware resources in a physical rack, the apparatus comprising:
    a hardware management system to:
        discover a first sub rack unit including a first sub rack unit module having an array of central processing units, the first sub rack unit installed in a first physical rack;
        discover a second sub rack unit, different than the first sub rack unit, including a second sub rack unit module having an array of physical memory units, the second sub rack unit installed in a second physical rack; and
        generate a listing of disaggregated physical hardware resources including the central processing units and the physical memory units; and
    a physical resource manager to generate a composed resource based on resources from the listing of the disaggregated physical hardware resources, the composed resource to include:
        a first identifier identifying a first subset of the central processing units in the first sub rack unit module, and
        a second identifier identifying a second subset of the physical memory units in the second sub rack unit module,
    the physical resource manager to communicate the composed resource to the hardware management system, the hardware management system to power on the composed resource by communicating with the first sub rack unit associated with the first identifier and the second sub rack unit associated with the second identifier.

2. An apparatus as defined in claim 1, wherein the physical resource manager is to recompose the composed resource to at least one of allocate additional physical hardware resources or de-allocate excess physical hardware resources.

3. An apparatus as defined in claim 2, wherein the physical resource manager is to recompose the composed resource in response to a change in a workload executed by the composed resource.

4. An apparatus as defined in claim 2, wherein the physical resource manager is to recompose the composed resource in real time while the composed resource executes a workload.

5. An apparatus as defined in claim 2, wherein the composed resource is a first composed resource and the physical resource manager is to re-allocate physical hardware resources from a second composed resource to the first composed resource when the first composed resource is associated with a first application having a higher priority than a second application associated with the second composed resource.

6. An apparatus as defined in claim 2, wherein the physical resource manager is to re-allocate physical hardware resources that are in separate physical racks.

7. A method to manage disaggregated physical hardware resources in a physical rack, the method comprising:

discovering, with a hardware management system, a first sub rack unit including a first sub rack unit module having an array of central processing units, the first sub rack unit installed in a first physical rack; and discovering, with a hardware management system, a second sub rack unit, different than the first sub rack unit, including a second sub rack unit module having an array of physical memory units, the second sub rack unit installed in a second physical rack;

sending an inventory of disaggregated physical hardware resources from the hardware management system to a physical resource manager, the disaggregated physical hardware resources including the central processing units and the physical memory units; and receiving, from the physical resource manager, a composed resource at the hardware management system, the composed resource generated by the physical resource manager based on ones of the physical hardware resources from the inventory of the disaggregated physical hardware resources, the composed resource including:
  a first identifier identifying a first subset of the central processing units in the first sub rack unit module, and
  a second identifier identifying a second subset of the physical memory units in the second sub rack unit module, powering on the composed resource by communicating with the first sub rack unit associated with the first identifier and the second sub rack unit associated with the second identifier.

8. A method as defined in claim 7, further including receiving a recomposed instance of the composed resource, the recomposed instance generated by the physical resource manager to at least one of allocate additional physical hardware resources to the composed resource or de-allocate excess physical hardware resources from the composed resource.

9. A method as defined in claim 8, wherein the receiving of the recomposed instance of the composed resource occurs in response to a change in a workload executed by the composed resource.

10. A method as defined in claim 8, wherein the receiving of the recomposed instance of the composed resource occurs in real time while the composed resource is executing a workload.

11. A method as defined in claim 8, wherein the composed resource is a first composed resource, the recomposed instance of the first composed resource including physical hardware resources re-allocated from a second composed resource to the first composed resource when the first composed resource is associated with a first application having a higher priority than a second application associated with the second composed resource.

12. A tangible computer readable storage medium comprising instructions that, when executed, cause a machine to at least:

discover a first sub rack unit including a first sub rack unit module having an array of central processing units, the first sub rack unit installed in a first physical rack;

discover a second sub rack unit, different than the first sub rack unit, including a second sub rack unit module having an array of physical memory units, the second sub rack unit installed in a second physical rack;

send an inventory of disaggregated physical hardware resources to a physical resource manager, the disaggregated physical hardware resources including the central processing units and the physical memory units; and receive a composed resource from the physical resource manager, the composed resource generated by the physical resource manager based on ones of the disaggregated physical hardware resources from the inventory of the disaggregated physical hardware resources, the composed resource including:
  a first identifier identifying a first subset of the central processing units in the first sub rack unit module, and
  a second identifier identifying a second subset of the physical memory units in the second sub rack unit module, power on the composed resource by communicating with the first sub rack unit associated with the first identifier and the second sub rack unit associated with the second identifier.

13. A storage medium as defined in claim 12, wherein the instructions, when executed, cause the machine to receive a recomposed instance of the composed resource, the recomposed instance generated by the physical resource manager to at least one of allocate additional physical hardware resources to the composed resource or de-allocate excess physical hardware resources from the composed resource.

14. A storage medium as defined in claim 13, wherein the instructions, when executed, cause the machine to receive the recomposed instance of the composed resource in response to a change in a workload executed by the composed resource.

15. A storage medium as defined in claim 13, wherein the composed resource is a first composed resource, the recomposed instance of the first composed resource including physical hardware resources re-allocated from a second composed resource to the first composed resource when the first composed resource is associated with a first application having a higher priority than a second application associated with the second composed resource.

* * * * *